(12) United States Patent
Ribas-Corbera et al.

(10) Patent No.: US 8,345,754 B2
(45) Date of Patent: Jan. 1, 2013

(54) SIGNALING BUFFER FULLNESS

(75) Inventors: Jordi Ribas-Corbera, Redmond, WA (US); Sridhar Srinivasan, Redmond, WA (US); Shankar Regunathan, Bellevue, WA (US); Regis J. Crinon, Camas, WA (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 10/934,118

(22) Filed: Sep. 2, 2004

(65) Prior Publication Data

US 2005/0074061 A1 Apr. 7, 2005

Related U.S. Application Data

(60) Provisional application No. 60/501,133, filed on Sep. 7, 2003, provisional application No. 60/501,081, filed on Sep. 7, 2003.

(51) Int. Cl.
*H04N 7/32* (2006.01)
*H04N 5/956* (2006.01)
*H04N 7/48* (2006.01)
*H04N 7/50* (2006.01)

(52) U.S. Cl. ............... 375/240.12; 375/240.26

(58) Field of Classification Search ............... None
See application file for complete search history.

(56) References Cited

U.S. PATENT DOCUMENTS

| | | | |
|---|---|---|---|
| 4,706,260 A | 11/1987 | Fedele et al. | |
| 4,954,892 A | 9/1990 | Asai et al. | |
| 5,235,618 A | 8/1993 | Sakai et al. | |
| 5,291,486 A | 3/1994 | Koyanagi | |
| 5,301,242 A * | 4/1994 | Gonzales et al. | 382/239 |
| 5,365,552 A * | 11/1994 | Astle | 375/354 |
| 5,541,852 A | 7/1996 | Eyuboglu et al. | |
| 5,566,208 A * | 10/1996 | Balakrishnan | 375/240 |
| 5,606,539 A | 2/1997 | De Haan et al. | |
| 5,608,697 A | 3/1997 | De Haan et al. | |
| 5,793,980 A | 8/1998 | Glaser et al. | |
| 5,844,867 A | 12/1998 | De Haan et al. | |
| 5,872,575 A | 2/1999 | Segal | |
| 5,933,451 A | 8/1999 | Ozkan et al. | |
| 5,952,943 A | 9/1999 | Walsh et al. | |
| 5,970,173 A | 10/1999 | Lee et al. | |
| 6,060,997 A | 5/2000 | Taubenheim et al. | |
| 6,072,831 A | 6/2000 | Chen | |

(Continued)

FOREIGN PATENT DOCUMENTS

EP 0852445 A2 8/1998

(Continued)

OTHER PUBLICATIONS

International Telecommunications Union Recommendation H.262 (Jul. 1995).*

(Continued)

*Primary Examiner* — David Czekaj
*Assistant Examiner* — David N Werner
(74) *Attorney, Agent, or Firm* — Klarquist Sparkman, LLP

(57) ABSTRACT

Techniques and tools are described for signaling hypothetical reference decoder parameters for video bitstreams, including signaling of buffer fullness. For example, a buffer size syntax element indicates a decoder buffer size, and a buffer fullness syntax element indicates a buffer fullness as a fraction of the decoder buffer size. As another example, buffer fullness is signaled in one or more entry point headers and other hypothetical reference decoder parameters are signaled in a sequence header.

24 Claims, 17 Drawing Sheets

U.S. PATENT DOCUMENTS

| | | |
|---|---|---|
| 6,088,063 A | 7/2000 | Shiba |
| 6,101,195 A | 8/2000 | Lyons et al. |
| 6,141,053 A | 10/2000 | Saukkonen |
| 6,195,392 B1 | 2/2001 | O'Grady |
| 6,233,226 B1 | 5/2001 | Gringeri et al. |
| 6,337,880 B1 | 1/2002 | Cornog et al. |
| 6,408,096 B2 | 6/2002 | Tan |
| 6,459,811 B1 | 10/2002 | Hurst, Jr. |
| 6,671,323 B1 | 12/2003 | Tahara et al. |
| 6,728,317 B1 | 4/2004 | Demos |
| 6,775,840 B1 | 8/2004 | Naegel et al. |
| 6,792,048 B1 | 9/2004 | Lee et al. |
| 6,842,485 B2 | 1/2005 | Monda et al. |
| 6,873,629 B2 | 3/2005 | Morris |
| 7,212,726 B2 | 5/2007 | Zetts |
| 2001/0055469 A1 | 12/2001 | Shida et al. |
| 2002/0012394 A1 | 1/2002 | Hatano et al. |
| 2002/0061067 A1 | 5/2002 | Lyons et al. |
| 2002/0061073 A1 | 5/2002 | Huang et al. |
| 2002/0080875 A1 | 6/2002 | Tahara et al. |
| 2002/0105951 A1 | 8/2002 | Hannuksela et al. |
| 2002/0191712 A1 | 12/2002 | Gaddam et al. |
| 2003/0053416 A1 | 3/2003 | Ribas-Corbera et al. |
| 2003/0231593 A1* | 12/2003 | Bauman et al. ............... 370/235 |
| 2004/0142699 A1 | 7/2004 | Jollota et al. |
| 2004/0255063 A1 | 12/2004 | Crinon et al. |
| 2005/0175098 A1* | 8/2005 | Narasimhan et al. .... 375/240.12 |
| 2006/0013568 A1 | 1/2006 | Rodriguez |
| 2006/0143678 A1 | 6/2006 | Chou et al. |

FOREIGN PATENT DOCUMENTS

| | | |
|---|---|---|
| JP | 04-297179 | 10/1992 |
| JP | 08-223385 | 8/1996 |
| JP | 09-261266 | 10/1997 |
| JP | 9-321813 | 12/1997 |
| JP | 10-294757 | 11/1998 |
| JP | 2000-286865 | 10/2000 |
| JP | 2001-109686 | 4/2001 |
| JP | 2001-169261 | 6/2001 |
| JP | 2001-203767 | 7/2001 |
| JP | 2001-274858 | 10/2001 |
| KR | 10-2001-39215 | 5/2001 |
| WO | WO 00/30356 | 5/2000 |
| WO | WO 02/32083 | 4/2002 |

OTHER PUBLICATIONS

Jenkac, H., Stockhammer, T., and Kuhn, G. "On Video Streaming over Variable Bit-Rate and Wireless Channels". Presented at Packet Video 2003, Nantes, France, Apr. 28-29, 2003.*

T. Wiegand, G. Sullivan, G. Bjontegaard, & A. Luthra, "Overview of the H.264 / AVC Video Coding Standard", 13 IEEE Trans. on Circuits & Sys. for Video Tech. 560-576 (Jul. 2003).*

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 18 pp. (Jul. 19, 2002) [Downloaded from the World Wide Web on Mar. 16, 2004].

Sullivan et al., "The H.264/AVC Advanced Video Coding Standard: Overview and Introduction to the Fidelity Range Extensions," 21 pp. (Aug. 2004).

U.S. Appl. No. 60/488,710, filed Jul. 18, 2003, Srinivasan et al.

Pao et al., "Encoding Stored Video for Streaming Applications," *IEEE Transactions on Circuits and Systems for Video Technology*, vol. 11, No. 2, pp. 199-209 (Feb. 2001).

Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).

Ribas-Corbera et al., A Generalized Hypothetical Reference Decoder for H.26L (proposal) ITU Study Group 16 Question 6 (Q.6/SG16), VCEG, VCEG-N58, 14th Meeting, Santa Barbara, CA, Sep. 2001.

Anonymous, International Search Report in EP Application No. EP 0201 9056.7-1522, 4 pp. (Aug. 2003).

Chen et al., "Source Model for Transform Video Coder and Its Application—Part II: Variable Frame Rate Coding," *IEEE Transactions on Circuits and Systems for Video Technology*, 7(2); 13 pp. (Apr. 1997).

Hsu, Chi-Yuan et al., "Joint Selection of Source and Channel Rate for VBR Video Transmission Under ATM Policing Constraints" *IEEE Journal on Selected Areas in Communications*, 15(6); 13 pp. (Aug. 1997).

Reibman, et al., "Constraints on Variable Bit-Rate Video for ATM Networks," *IEEE Transactions on Circuits and Systems for Video Technology*, 2(4); 12 pp. (Dec. 1992).

Ribas-Corbera et al., "A Generalized Hypothetical Reference Decoder for H.264/AVC," *IEEE Transactions on Circuits and Systems for Video Technology*, 13(7); 14 pp. (Jul. 2003).

ISO/IEC JVT-G050r1 (Draft ITU-T Rec. H.264), "Joint Video Specification," 268 pp. (May 2003).

ISO/IEC 14496-2, "Coding of Audio-Visual Objects: Visual," 330 pp. (Mar. 1998).

ISO/IEC 11172-2, "Coding of Moving Pictures and Associated Audio for Digital Storage Media at Up to About 1,5 Mbit/s, Part 2: Video," 122 pp. (Aug. 1993).

ISO/IEC JVT-D131, "HRD and Related Issues," 5 pp. (Jul. 2002).

ISO/IEC JVT-D157, "Joint Video Specification," 206 pp. (Jul. 2002).

ISO/IEC JVT-E133, "Time-Shift Causality Constraint on the CAT-LB HRD," 8 pp. (Oct. 2002).

ITU-Telecommunications Standardization Sector, VCEG-N58, "A Generalized Hypothetical Reference Decoder for H.26L," 14 pp. (Sep. 2001).

ITU-T Recommendation H.261, "Line Transmission of Non-Telephone Signals," International Telecommunication Union, 28 pp. (Mar. 1993).

ITU-T Recommendation H.262, "Transmission of Non-Telephone Signals," International Telecommunication Union, 211 pp. (Jul. 1995).

ITU-T Recommendation H.263, "Series H: Audiovisual and Multimedia Systems, Infrastructure of Audiovisual Services—Coding of Moving Video," International Telecommunication Union, 167 pp. (Feb. 1998).

ISO/IEC 13818-1, "MPEG-2 Systems—Coding of Moving Pictures and Associated Audio," 129 pp. (Mar. 1994).

Cliff Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

ISO/IEC 13818-1, "MPEG-2 Systems—Coding of Moving Pictures and Associated Audio," second edition, 171 pp. (Dec. 2000).

ITU-T Recommendation H.263, "Draft H.263," International Telecommunication Union, pp. 5, 46, 47 (Jan. 1998).

Joint Video Team (JVT) of ISO/IEC MPEG & ITU-T VCEG, ISO/IEC JVT-E075, "HRD Clean-up," 7 pp. (Oct. 2002).

Sheu et al., "A Buffer Allocation Mechanism for VBR Video Playback," Communication Tech. Proc. 2000, WCC-ICCT 2000, vol. 2, pp. 1641-1644 (Aug. 2000).

SMPTE, "Proposed SMPTE Standard for Television: VC-9 Compressed Video Bitstream Format and Decoding Process," Working Draft 2 (Oct. 2003).

Walpole et al., "A Player for Adaptive MPEG Video Streaming over the Internet," *Proc. SPIE*, vol. 3240, pp. 270-281 (Mar. 1998).

Wang et al., "Research on HDTV decoder synchronization system," *IEEE*, pp. 868-870 (Dec. 2000).

Lee et al., "The MPEG-4 Streaming Player Using Adaptive Decoding Time Stamp Synchronization," *Proc. of the 9th Int'l Conf. on Parallel and Distributed Systems*, pp. 398-403 (Dec. 2002).

\* cited by examiner

Software 180 implementing video encoder and/or decoder with capability for signaling of buffer fullness relative to buffer size

Figure 4

| Hrd_parameters( ) | Descriptor | Range |
|---|---|---|
| { | | |
| Hrd_num_leaky_buckets | FLC-5 (uimsbf) | (1, 32) |
| bit_rate_exponent | FLC-4 (uimsbf) | (6, 21) |
| buffer_size_exponent | FLC-4 (uimsbf) | (4, 19) |
| for( n=1; n <= hrd_num_leaky_buckets; n++ ) | | |
| { | | |
| hrd_rate[ n ] | FLC-16 (uimsbf) | $(1, 2^{16})$ |
| hrd_buffer[ n ] | FLC-16 (uimsbf) | $(1, 2^{16})$ |
| } | | |

Figure 9

| Hrd_parameters( ) | Descriptor | Range |
|---|---|---|
| { | | |
| hrd_num_leaky_buckets | FLC-5 | (1, 32) |
| bit_rate_exponent | FLC-4 | (6,21) |
| buffer_size_exponent | FLC-4 | (4,19) |
| for( n=1; n <= hrd_num_leaky_buckets; n++ ) | | |
| { | | |
| hrd_rate[ n ] | FLC-16 | $(1, 2^{16})$ |
| hrd_buffer[ n ] | FLC-16 | $(1, 2^{16})$ |
| hrd_fullness[ n ] | FLC - 8 | (0, 255) |
| } | | |

| LEVEL | Meaning |
|---|---|
| 000 | Level 0 |
| 001 | Level 1 |
| 010 | Level 2 |
| 011 | Level 3 |
| 100 | Level 4 |
| 101-111 | Reserved |

Figure 12

| Profile | Level | Rmax[profile,level] | VBVmax[profile,level] |
|---|---|---|---|
| Simple | Low | 96,000 bits/sec | 327,680 bits = 40 x 1024 bytes |
|  | Medium | 384,000 bits/sec | 1261568 bits = 154 x 1024 bytes |
| Main | Low | 2,000,000 bits/sec | 5013504 bits = 612 x 1024 bytes |
|  | Medium | 10,000,000 bits/sec | 10010624 bits = 1222 x 1024 bytes |
|  | High | 20,000,000 bits/sec | 40009728 bits = 4884 x 1024 bytes |
| Advanced | L0 | 2,000,000 bits/sec | 4096000 bits = 500 x 1024 bytes |
|  | L1 | 10,000,000 bits/sec | 20480000 bits = 2,500 x 1024 bytes |
|  | L2 | 20,000,000 bits/sec | 40960000 bits = 5,000 x 1024 bytes |
|  | L3 | 45,000,000 bits/sec | 90112000 bits = 11,000 x 1024 bytes |
|  | L4 | 135,000,000 bits/sec | 270336000 bits = 33,000 x 1024 bytes |

Figure 13

| hrd_fullness( ) | Descriptor | Range |
|---|---|---|
| { | | |
|    for( n=1; n <= HRD_NUM_LEAKY_BUCKETS; n++ ) | | |
| { | | |
|    HRD_FULLNESS[ n ] | FLC - 8 | (0, 255) |
| } | | |

Figure 15

| Profile@ Level 1710 | MB/s | MB/f | Examples | Rmax 1720 | Bmax 1730 | MV [H] x [V] |
|---|---|---|---|---|---|---|
| SP@LL | 1,485 | 99 | QCIF 15 Hz | 96 | 20 | [-64, 63¾] x [-32, 31¾] |
| SP@ML | 5,940 | 396 | QVGA, 24 Hz CIF, 15 Hz | 384 | 77 | [-64, 63¾] x [-32, 31¾] |
| MP@LL | 7,200 | 396 | CIF 30 Hz | 2,000 | 306 | [-128, 127¾] x [-64, 63¾] |
| MP@ML | 40,500 | 1,620 | 480p, 30 Hz 576p, 25 Hz | 10,000 | 611 | [-512, 511¾] x [-128, 127¾] |
| MP@HL | 245,760 | 8,192 | 1080p 30 Hz | 20,000 | 2,442 | [-1024, 1023¾] x [-256, 255¾] |
| AP@LL | 5,940 | 396 | CIF 30 Hz | 2,000 | 306 | [-128, 127¾] x [-64, 63¾] |
| AP@ML | 40,500 | 1,620 | 480p/i, 30Hz 576p/i, 25Hz | 10,000 | 611 | [-512, 511¾] x [-128, 127¾] |
| AP@HL | 243,000 | 8,100 | 720p, 60 Hz 1080i, 30 Hz | 20,000 | 2,442 | [-1024, 1023¾] x [-256, 255¾] |

Figure 17

SIGNALING BUFFER FULLNESS

RELATED APPLICATION INFORMATION

This application claims the benefit of U.S. Provisional Patent Application Ser. No. 60/501,133, filed Sep. 7, 2003, the disclosure of which is incorporated herein by reference. This application also claims the benefit of U.S. Provisional Patent Application Ser. No. 60/501,081, filed Sep. 7, 2003, the disclosure of which is incorporated herein by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Described tools and techniques relate to encoding and decoding video data in compliance with a hypothetical reference decoder for which buffer fullness is signaled.

BACKGROUND

For many video codecs and coding standards, a bitstream is compliant if it can be decoded, at least conceptually, by a mathematical model of a decoder that is connected to the output of an encoder. For example, such a model decoder is known as a hypothetical reference decoder ("HRD") in the H.263 coding standard, and a video buffering verifier ("VBV") in the MPEG-2 coding standard. In general, a real decoder device (or terminal) comprises a decoder buffer, a decoder, and a display unit. If a real decoder device is constructed according to the mathematical model of the decoder, and a compliant bitstream is transmitted to the device under specific conditions, then the decoder buffer will not overflow or underflow and decoding will be performed correctly.

Some previous reference (model) decoders assume that a bitstream will be transmitted through a channel at a given constant bit rate, and will be decoded (after a given buffering delay) by a device having some given buffer size. Therefore, these models are quite inflexible and do not address the requirements of many of today's important video applications such as broadcasting live video, or streaming pre-encoded video on demand over network paths with various peak bit rates, to devices with various buffer sizes.

In these previous reference decoders, the video bitstream is received at a given constant bit rate, (usually the average rate in bits per second of the stream) and is stored in the decoder buffer until the buffer reaches some desired level of fullness. For example, at least the data corresponding to one initial frame of video information is needed before decoding can reconstruct an output frame therefrom. This desired level is denoted as the initial decoder buffer fullness and, at a constant bit rate, is directly proportional to a transmission or start-up (buffer) delay expressed in units of time. Once this fullness is reached, the reference decoder instantaneously removes the bits for the first video frame of the sequence, and decodes the bits to display the frame. The bits for the following frames are also removed, decoded, and displayed instantaneously at subsequent time intervals.

Such a reference decoder operates at a fixed bit rate, buffer size, and initial delay. However, in many contemporary video applications, (e.g., video streaming through the Internet or ATM networks), the peak bandwidth varies according to the network path. For example, the peak bandwidth differs based on whether the connection to the network is by modem, ISDN, DSL, cable and so forth. Moreover, the peak bandwidth may also fluctuate in time according to network conditions, e.g., based on network congestion, the number of users connected, and other factors. Still further, the video bitstreams are delivered to a variety of devices with different buffer size capabilities, including hand-sets, Personal Digital Assistants (PDAs), PCs, pocket-sized computing devices, television set-top boxes, Digital Video Disc ("DVD") or DVD-like players, and the like, and are created for scenarios with different delay requirements, e.g., low-delay streaming, progressive download, and the like.

Most existing reference decoders do not adjust for such variables. At the same time, the corresponding encoders typically do not know in advance what the variable conditions will be for a given recipient. As a result, resources and/or delay time are often wasted unnecessarily, or are unsuitable, in many instances. U.S. patent application Publication No. 2003-0053416 A1, published on Mar. 20, 2003, discloses various techniques and tools for a reference decoder that overcome these problems, for example, by using multiple leaky bucket models for a given bitstream.

Traditionally, the signaling of buffer fullness in the bitstream is either (1) as the absolute number of bits that should be filled in the buffer, as in U.S. patent application Publication No. 2003-0053416 A1, or (2) as the number of seconds required to fill the buffer at a rate R, as in the MPEG-2 standard. There is a need for a more efficient way to signal buffer fullness values. This is especially the case where multiple sets of parameters, such as leaky bucket models, are signaled for a bitstream, or where parameters are updated or changed in a bitstream.

SUMMARY

Described tools and techniques relate to signaling of parameters for reference decoders. For example, a buffer fullness is signaled relative to a buffer size or as a fraction of a buffer size, as opposed to as an absolute number of bits or a start-up delay. Such signaling of buffer fullness relative to buffer size allows for more efficient signaling in many situations.

According to a first aspect of the tools and techniques, at least one buffer capacity syntax element that indicates a decoder buffer capacity associated with a video bitstream and at least one buffer fullness syntax element that indicates a buffer fullness associated with the video bitstream are parsed. The buffer fullness is signaled as a fraction of the decoder buffer capacity.

According to a second aspect of the tools and techniques, a coded video bitstream is output and a leaky bucket model that contains the bitstream is signaled. The leaky bucket model includes at least one transmission rate syntax element that indicates a transmission bit rate, at least one buffer capacity syntax element that indicates a decoder buffer capacity, and one or more buffer fullness syntax elements that each indicates a buffer fullness relative to the buffer capacity.

According to a third aspect of the tools and techniques, a leaky bucket model that will contain a bitstream is processed. The model includes at least one transmission rate syntax element that indicates a peak transmission bit rate for a video bitstream, at least one buffer size syntax element that indicates a buffer size, and at least one buffer fullness syntax element that indicates buffer fullness in units of buffer size divided by a denominator for a portion of the video bitstream. At least part of the leaky bucket model is used to determine a minimum buffer fullness value F in bits, and at least F bits are buffered before decoding the portion of the bitstream.

According to a fourth aspect of the tools and techniques, a coded video bitstream is output. At least one transmission rate syntax element that indicates a transmission bit rate and at least one buffer capacity syntax element that indicates a decoder buffer capacity are signaled in a sequence header of the video bitstream. Additionally, at least one buffer fullness syntax element that indicates a buffer fullness is signaled in at least one entry point header in the bitstream.

Additional features and advantages will be made apparent from the following detailed description of various embodiments that proceeds with reference to the accompanying drawings.

BRIEF DESCRIPTION OF THE DRAWINGS

FIG. 4 is a table depicting an example of coding hypothetical reference decoder syntax elements in a sequence header.

FIG. 9 is a table depicting a second example of coding hypothetical reference decoder syntax elements in a sequence header.

FIG. 12 is a table illustrating examples of codes used to signal different coding levels.

FIG. 13 is a table that illustrates exemplary values of maximum rates (Rmax) and buffer sizes (VBVmax) that correspond to different profiles and levels.

FIG. 15 is a table illustrating an example of coding hypothetical reference decoder fullness values in an entry point header.

FIG. 17 is a table illustrating exemplary values of maximum rates (Rmax) and buffer sizes (Bmax) that correspond to different profiles and levels.

DETAILED DESCRIPTION

Described embodiments relate to techniques and tools for video encoding and decoding that may utilize signaling of buffer fullness relative to buffer size, as well as techniques and tools for forming and parsing bitstreams that include such video data. The various techniques and tools can be used in combination or independently. Different embodiments implement one or more of the described techniques and tools.

I. Computing Environment

Figure 1:
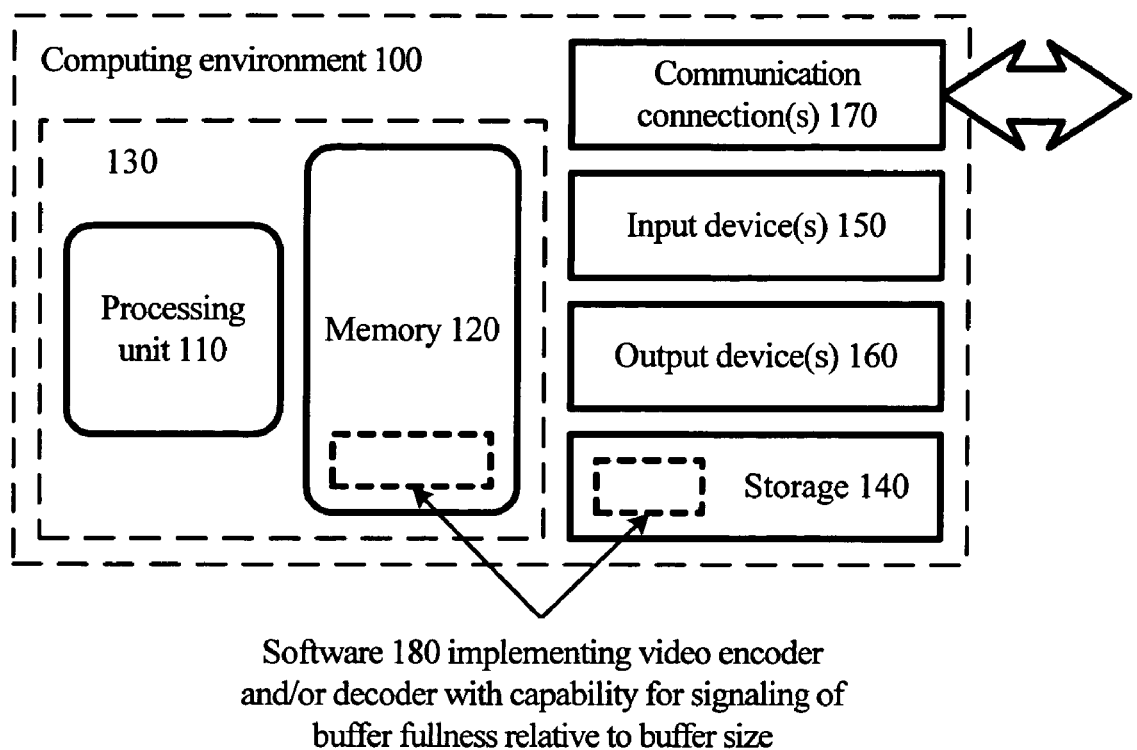
FIG. 1 is a block diagram of a suitable computing environment.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder or decoder, such as a video encoder or decoder with the capability to signal buffer fullness relative to buffer size and/or receive such signaling.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the encoder or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Generalized Video Encoder and Decoder

Figure 2:
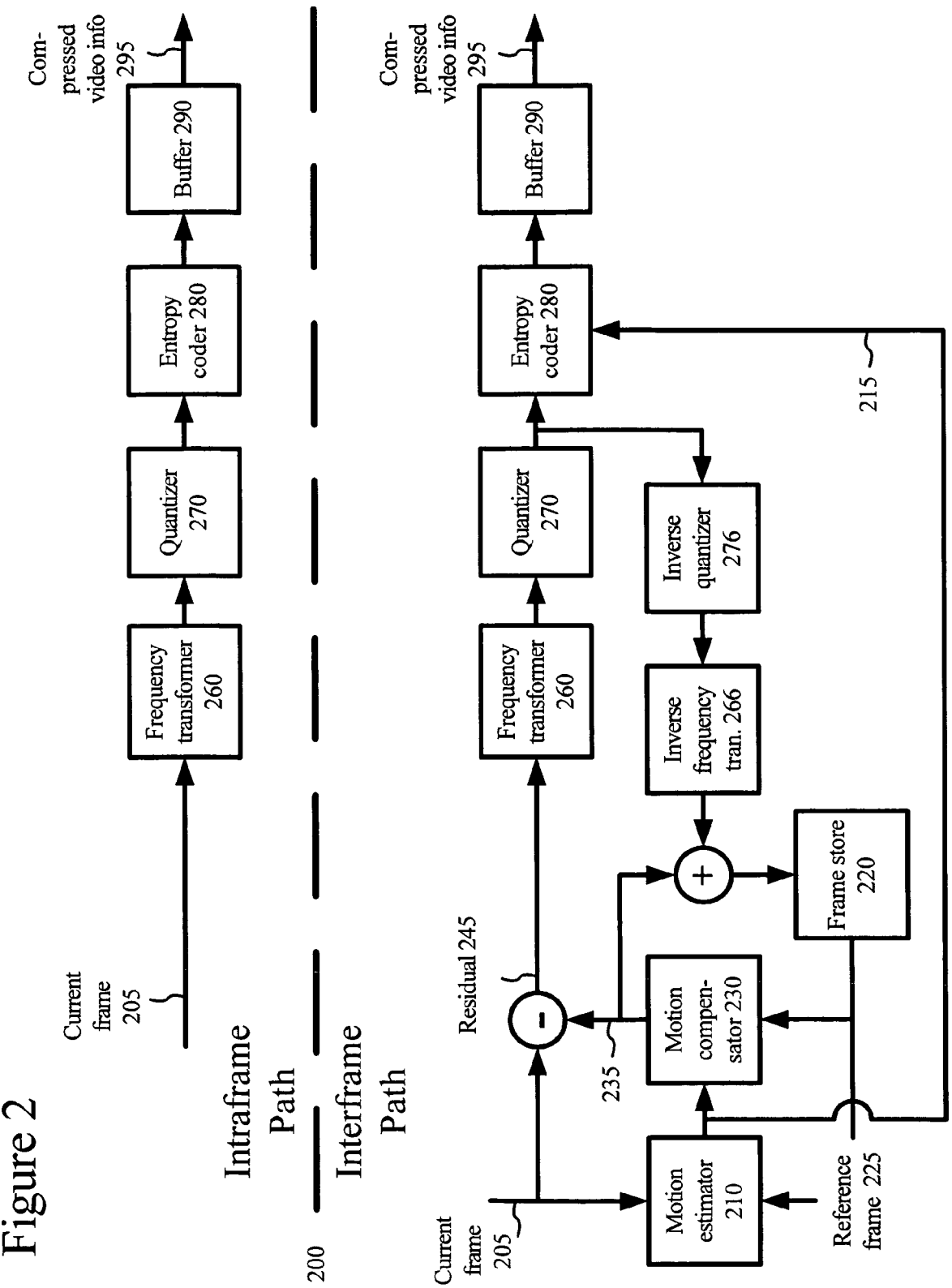
FIG. 2 is a block diagram of a generalized video encoder system.
Figure 3:
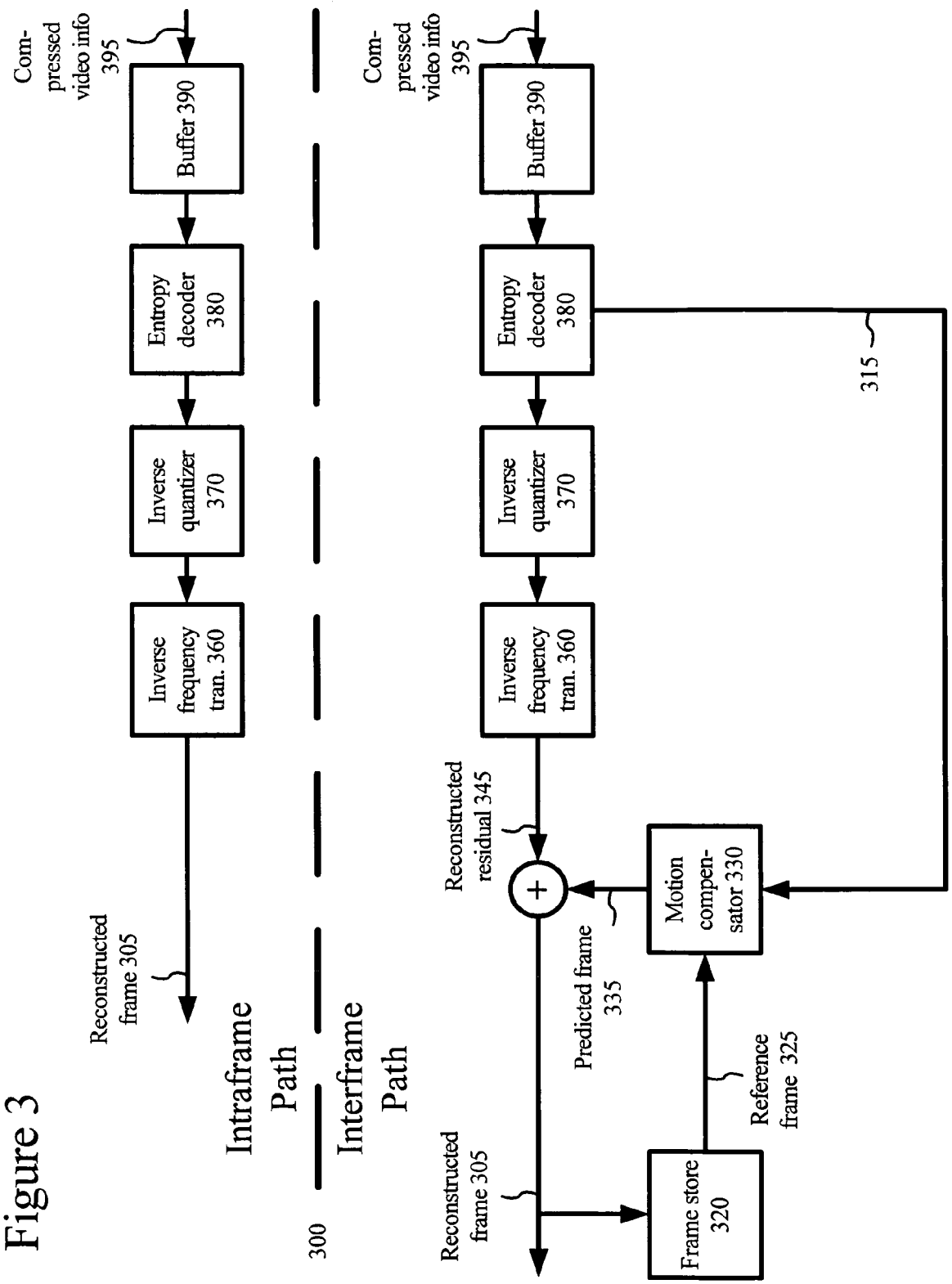
FIG. 3 is a block diagram of a generalized video decoder system.

FIG. 2 is a block diagram of a generalized video encoder (200), and FIG. 3 is a block diagram of a generalized video decoder (300), in conjunction with which signaling of hypothetical reference decoder parameters may be implemented, such as signaling buffer fullness relative to buffer size.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be Windows Media Video version 9 format or another format.

The encoder (200) and decoder (300) are block-based and use a 4:2:0 macroblock format with each macroblock including 4 luminance 8×8 luminance blocks (at times treated as one 16×16 macroblock) and two 8×8 chrominance blocks. Alternatively, the encoder (200) and decoder (300) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 2 is a block diagram of a general video encoder system (200). The encoder system (200) receives a sequence of video frames including a current frame (205), and produces compressed video information (295) as output. Particular embodiments of video encoders typically use a variation or supplemented version of the generalized encoder (200).

The encoder system (200) compresses predicted frames and key frames. For the sake of presentation, FIG. 2 shows a path for key frames through the encoder system (200) and a path for forward-predicted frames. Many of the components of the encoder system (200) are used for compressing both key frames and predicted frames. The exact operations performed by those components can vary depending on the type of information being compressed.

A predicted frame (also called p-frame, b-frame for bi-directional prediction, or inter-coded frame) is represented in terms of prediction (or difference) from one or more other frames. A prediction residual is the difference between what was predicted and the original frame. In contrast, a key frame (also called i-frame or intra-coded frame) is compressed without reference to other frames.

If the current frame (205) is a forward-predicted frame, a motion estimator (210) estimates motion of macroblocks or other sets of pixels of the current frame (205) with respect to a reference frame, which is the reconstructed previous frame (225) buffered in the frame store (220). In alternative embodiments, the reference frame is a later frame or the current frame is bi-directionally predicted. The motion estimator (210) can estimate motion by pixel, ½ pixel, ¼ pixel, or other increments, and can switch the precision of the motion estimation on a frame-by-frame basis or other basis. The precision of the motion estimation can be the same or different horizontally and vertically. The motion estimator (210) outputs as side information motion information (215) such as motion vectors. A motion compensator (230) applies the motion information (215) to the reconstructed previous frame (225) to form a motion-compensated current frame (235). The prediction is rarely perfect, however, and the difference between the motion-compensated current frame (235) and the original current frame (205) is the prediction residual (245). Alternatively, a motion estimator and motion compensator apply another type of motion estimation/compensation.

A frequency transformer (260) converts the spatial domain video information into frequency domain (i.e., spectral) data. For block-based video frames, the frequency transformer (260) applies a discrete cosine transform ("DCT") or variant of DCT (such as in the Windows Media Video 9 codec and in the H.264 standard) to blocks of the pixel data or prediction residual data, producing blocks of DCT coefficients. Alternatively, the frequency transformer (260) applies another conventional frequency transform such as a Fourier transform or uses wavelet or subband analysis. In embodiments in which the encoder uses spatial extrapolation (not shown in FIG. 2) to encode blocks of key frames, the frequency transformer (260) can apply a re-oriented frequency transform such as a skewed DCT to blocks of prediction residuals for the key frame. In other embodiments, the frequency transformer (260) applies an 8×8, 8×4, 4×8, or other size frequency transforms (e.g., DCT) to prediction residuals for predicted frames.

A quantizer (270) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

If a given macroblock in a predicted frame has no information of certain types (e.g., no motion information for the macroblock and no residual information), the encoder (200) may encode the macroblock as a skipped macroblock. If so, the encoder signals the skipped macroblock in the output bitstream of compressed video information (295).

When a reconstructed current frame is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted frame) or a reconstructed key frame.

If the current frame (205) was a key frame, the reconstructed key frame is taken as the reconstructed current frame (not shown). If the current frame (205) was a predicted frame, the reconstructed prediction residual is added to the motion-compensated current frame (235) to form the reconstructed current frame. The frame store (220) buffers the reconstructed current frame for use in predicting the next frame. In some embodiments, the encoder applies a deblocking filter to the reconstructed frame to adaptively smooth discontinuities in the blocks of the frame.

The entropy coder (280) compresses the output of the quantizer (270) as well as certain side information (e.g., motion information (215), spatial extrapolation modes, quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bit rate adaptive modules.

The compressed video information (295) is depleted from the buffer (290) at a constant or relatively constant bit rate and stored for subsequent streaming at that bit rate. Therefore, the level of the buffer (290) is primarily a function of the entropy of the filtered, quantized video information, which affects the efficiency of the entropy coding. Alternatively, the encoder system (200) streams compressed video information immediately following compression, and the level of the buffer (290) also depends on the rate at which information is depleted from the buffer (290) for transmission.

Before or after the buffer (290), the compressed video information (295) can be channel coded for transmission over the network. The channel coding can apply error detection and correction data to the compressed video information (295).

B. Video Decoder

FIG. 3 is a block diagram of a general video decoder system (300). The decoder system (300) receives information (395) for a compressed sequence of video frames and produces output including a reconstructed frame (305). Particular embodiments of video decoders typically use a variation or supplemented version of the generalized decoder (300).

The decoder system (300) decompresses predicted frames and key frames. For the sake of presentation, FIG. 3 shows a path for key frames through the decoder system (300) and a path for forward-predicted frames. Many of the components of the decoder system (300) are used for decompressing both key frames and predicted frames. The exact operations performed by those components can vary depending on the type of information being decompressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate. Before or after the buffer (390), the compressed video information can be channel decoded and processed for error detection and correction.

The entropy decoder (380) entropy decodes entropy-coded quantized data as well as entropy-coded side information (e.g., motion information (815), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the frame (305) to be reconstructed is a forward-predicted frame, a motion compensator (330) applies motion information (315) to a reference frame (325) to form a prediction (335) of the frame (305) being reconstructed. For example, the motion compensator (330) uses a macroblock motion vector to find a macroblock in the reference frame (325). A frame store (320) stores previous reconstructed frames for use as reference frames. The motion compensator (330) can compensate for motion at pixel, ½ pixel, ¼ pixel, or other increments, and can switch the precision of the motion compensation on a frame-by-frame basis or other basis. The precision of the motion compensation can be the same or different horizontally and vertically. Alternatively, a motion compensator applies another type of motion compensation. The prediction by the motion compensator is rarely perfect, so the decoder (300) also reconstructs prediction residuals.

When the decoder needs a reconstructed frame for subsequent motion compensation, the frame store (320) buffers the reconstructed frame for use in predicting the next frame. In some embodiments, the encoder applies a deblocking filter to the reconstructed frame to adaptively smooth discontinuities in the blocks of the frame.

An inverse quantizer (370) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (360) converts the quantized, frequency domain data into spatial domain video information. For block-based video frames, the inverse frequency transformer (360) applies an inverse DCT ("IDCT") or variant of IDCT to blocks of the DCT coefficients, producing pixel data or prediction residual data for key frames or predicted frames, respectively. Alternatively, the inverse frequency transformer (360) applies another conventional inverse frequency transform such as an inverse Fourier transform or uses wavelet or subband synthesis. In embodiments in which the decoder uses spatial extrapolation (not shown in FIG. 3) to decode blocks of key frames, the inverse frequency transformer (360) can apply a re-oriented inverse frequency transform such as a skewed IDCT to blocks of prediction residuals for the key frame. In other embodiments, the inverse frequency transformer (360) applies an 8×8, 8×4, 4×8, or other size inverse frequency transforms (e.g., IDCT) to prediction residuals for predicted frames.

III. Hypothetical Reference Decoder with Fractional Buffer Fullness Signaling

One goal of a typical hypothetical reference decoder ("HRD") is to limit the encoder's bit rate fluctuations according to a basic buffering model, so that the resources necessary to decode a bitstream are predictable. One buffering model that can govern the operation of a HRD is known as a leaky bucket. A typical leaky bucket model is characterized by three parameters:

R is the peak transmission bit rate at which bits enter the decoder buffer,

B is the capacity of the decoder buffer, and

F is the initial decoder buffer fullness, which is smaller than or equal to B.

A leaky bucket may also be specified by parameters (R, B, $F^e$), where $F^e$ is the initial encoder buffer fullness.

According to the HRD model, the video bitstream is received at a bit rate smaller than or equal to the peak transmission rate R, and it is stored into a decoder buffer of size B until the buffer fullness reaches F bits. At the instant when the buffer fullness reaches level F bits or any level greater than F bits (as long as it is less than B), the decoder instantaneously removes the bits for the first video frame of the sequence from the buffer, and instantaneously decodes that frame. The bits for the following frames are also removed and decoded instantaneously at subsequent time intervals. Of course, during actual decoding the ideal characteristics of the HRD may not be realized. For example, bits are not instantaneously removed from the buffer and decoded, although the time for such removal and decoding may be substantially negligible compared to transmission delay times or playback timing.

According to a particular HRD model, the decoder buffer may fill up, but it should not overflow or underflow. To be more concrete, the buffer fullness at any time instant should be greater than or equal to zero, and less than or equal to B. According to one definition of "contain," a leaky bucket with parameters (R, B, F) is said to contain a coded video bitstream if there is no underflow of the decoder buffer.

When the decoding process starts with fewer than F bits in the buffer, the decoded video may jitter or momentarily freeze due to underflow of the decoder buffer, even when the data transmission rate R is available. When the decoding process starts with F bits (or higher) in the decoder buffer, and when the data transmission rate R is available, the decoder buffer does not underflow and sufficient data is available at the decoder to allow for the synchronous decoding of video.

A given video stream may be contained in many "leaky buckets." For example, if a video stream is contained in a leaky bucket with parameters (R, B, F), it will also be contained in a leaky bucket with a larger buffer size (R, B', F), B'>B, or in a leaky bucket with a higher peak transmission bit rate (R', B, F), R'>R, or in a leaky bucket with larger initial buffer fullness (R, B, F'), F'>F, F≦B. Moreover, it may also be contained in a leaky bucket with a lower peak transmission bit rate (R', B', F), R'<R, for some B' and F'<B' if the video is time-limited. In the worst case, as R' approaches 0, the buffer size and initial buffer fullness may be as large as the bitstream itself. In short, a time-limited video bitstream may be transmitted at any peak transmission bit rate (regardless of the average bit rate of the sequence) without suffering decoder buffer underflow, as long as the buffer size and delay are large enough.

In one implementation, the encoder signals N leaky bucket models, each of which contains the video bitstream. The desired value of N may be selected by the encoder. The parameter values of these leaky buckets may be expressed as follows: $(R_1, B_1, F_1), (R_2, B_2, F_2), \ldots, (R_N, B_N, F_N)$. N, $R_n$ and $B_n$ are signaled in the sequence header, while $F_n$ is signaled at every entry-point header, which helps provide points for random access in the bitstream. The following syntax elements are included in a sequence header for the bitstream:

HRD_NUM_LEAKY_BUCKETS—A number between 1 and 32 that specifies the number of leaky buckets N. The value of N−1 is encoded as a fixed length code ("FLC") in binary using 5 bits.

HRD_RATE[n] and BIT_RATE_EXPONENT—These syntax elements define the peak transmission rate $R_n$ in bits per second for the nth leaky bucket. The mantissa of $R_n$ is encoded in the syntax element HRD_RATE[n] using a FLC of 16 bits, and has the range from 1 to $2^{16}$. The base-2 exponent of $R_n$ is encoded in the syntax element BIT_RATE_EXPONENT in a FLC using 4 bits, and takes the range from 6 to 21. Thus, $R_n$=(HRD_RATE[n]+1)*$2^{(BIT\_RATE\_EXPONENT+6-16)}$.

HRD_BUFFER[n] and BUFFER_SIZE_EXPONENT—These syntax elements define the buffer size $B_n$ in bits for the nth leaky bucket. The mantissa of $B_n$ is encoded in the syntax element HRD_BUFFER[n], using a FLC of 16 bits, and has the range 1 to $2^{16}$. The value of the base-2 exponent of $B_n$ is encoded in the syntax element BUFFER_SIZE_EXPONENT using a FLC of 4 bits, and takes the range from 4 to 19. Thus, $B_n$=(HRD_BUFFER[n]+1)*$2^{(BUFFER\_SIZE\_EXPONENT+6-16)}$.

The rates are ordered from smallest to largest, i.e., HRD_RATE[n]<HRD_RATE[n+1], and conversely the corresponding buffer sizes are ordered from largest to smallest, i.e., HRD_BUFFER[n]>=HRD_BUFFER[n+1].

These syntax elements may be inserted in the sequence header as shown in FIG. 4.

The buffer fullness $F_n$ is sent at each entry-point in the bitstream (see FIGS. 14-15), which helps provide random access (decoding starting from that access point, such as after fast forwarding). Thus, it is advantageous if the syntax used for signaling buffer fullness is as efficient as possible, especially if multiple leaky bucket models are signaled. Note that $B_n$ (which is similar to $F_n$) may have a wide dynamic range. The conventional method to signal an F is to send the absolute number of bits for the F, or to send the number of seconds needed to fill the buffer before decoding can begin. If this is done, a lot of bits are required to represent each value of F, so that the entire dynamic range is represented with reasonable granularity in resolution.

For example, to encode buffer fullness as the absolute number of bits in the implementation described above would require at least 16 bits per $F_n$, which is equivalent to two bytes per $F_n$. If there are 32 leaky bucket models (the most possible), 64 bytes would be needed at every entry-point to represent the buffer fullness values for all the leaky buckets. Thus, it is desirable to use an alternate approach which uses fewer bits to represent the buffer fullness values, but can represent the entire dynamic range of $F_n$ with reasonable accuracy.

The buffer fullness $F_n$ is represented relative to the buffer size $B_n$, or more specifically as a fraction of the buffer size $B_n$. $F_n$ is represented using the syntax element HRD_FULLNESS [n], where HRD_FULLNESS[n] is a syntax element that defines the decoder buffer fullness as an upward rounded fraction of the buffer size $B_n$, in units of $B_n$/256. This element may take values in the range 1 to 256 and is encoded in binary using the 8 bit values 0 through 255 to uniformly cover the range.

This representation of $F_n$ as a fraction of the buffer size $B_n$ allows sufficient precision in representing the buffer fullness, while covering the entire dynamic range of possible buffer fullness values and using only 1 byte per $F_n$. The range of $F_n$ adjusts to match the range of $B_n$ because $F_n$ is represented as a fraction of $B_n$. In particular, this is advantageous because the buffer fullness $F_n$ is not greater than $B_n$. In conventional methods of signaling buffer fullness, part of the buffer fullness range possible in signaling may be wasted because it is greater than $B_n$. Accordingly, the representation of $F_n$ as a fraction of buffer size can lead to significant efficiency in terms of bits used for signaling. This is particularly true where multiple leaky buckets are signaled and multiple representations of buffer fullness are included at each entry point. However, the advantages are not limited to such a situation.

Alternatively, instead of coding fullness values as fractions of buffer size, an HRD uses another mechanism to signal fullness values relative to buffer size.

IV. Compound Implementations for Hypothetical Reference Decoder Features

The description below shows and describes bitstream syntax and semantics for a compound implementation of hypothetical reference decoder features and syntax elements. A video encoder such as the encoder (200) described above and shown in FIG. 2 performs one or more of the encoding techniques shown and described below, including the determination and signaling of one or more leaky bucket models. The encoder may use such techniques in various combinations, individually, or in conjunction with other techniques. Alternatively, another encoder or tool performs one or more of the encoding techniques shown and described.

A video decoder such as the decoder (300) described above and shown in FIG. 3 performs one or more of the decoding techniques shown and described below, including decoding according to the hypothetical reference decoder models described herein. The decoder may use such techniques in various combinations, individually, or in conjunction with other techniques. Alternatively, another decoder or tool performs one or more of the decoding techniques shown and described below.

Figure 5:
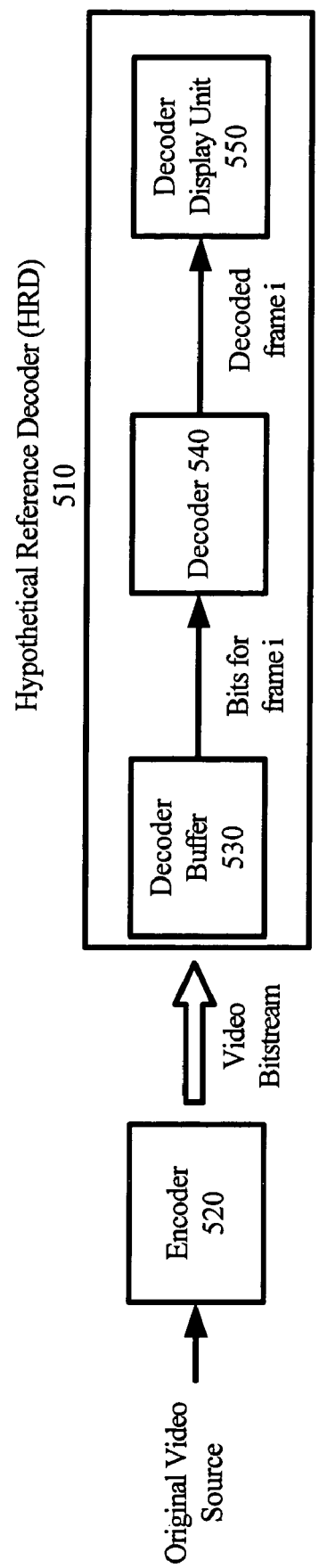
FIG. 5 is a block diagram of an encoder/decoder system that includes a hypothetical reference decoder.

Referring to FIG. 5, a hypothetical reference decoder ("HRD") (510) is conceptually connected to the output of an encoder (520), and includes a buffer (530), a decoder (540), and a display unit (550). The HRD (510) does not mandate buffering, decoding, or display mechanisms for decoder implementations. Rather, it limits the encoder's bit rate fluctuations according to a basic buffering model, so that the resources necessary to decode the bitstream are predictable.

The HRD (510) can operate in constant-delay mode or variable-delay mode. Constant-delay is typically appropriate for most applications, including broadcast, streaming, packaged media (e.g., DVD), etc. Variable-delay is typically appropriate for video conferencing. All computations may be done with infinite precision real-values, so that no rounding errors propagate, although less precise calculations may be desirable for other implementations.

A. Leaky Bucket Model

The buffering model that governs the operation of the HRD (510) is known as a leaky bucket. The leaky bucket is characterized by the three parameters (R, B, F) discussed above.

In the HRD (510), the video bitstream is received at a bit rate smaller than or equal to the peak transmission rate R, and it is stored into a decoder buffer (530) of size B until the buffer fullness reaches F bits. The time for the buffer fullness to reach F bits is typically referred to as the initial delay or start-up delay. Then, the decoder (540) instantaneously removes the bits for the first video frame of the sequence from the buffer (530), and instantaneously decodes that frame. The bits for the following frames are also removed and decoded instantaneously at subsequent time intervals. If a frame is coded as two interlaced fields, the bits for both fields are removed together and decoded instantaneously. Of course, frames are not removed and decoded instantaneously in an actual decoder. However, the time for removal and decoding can be assumed to be instantaneous for the models.

Figure 6:
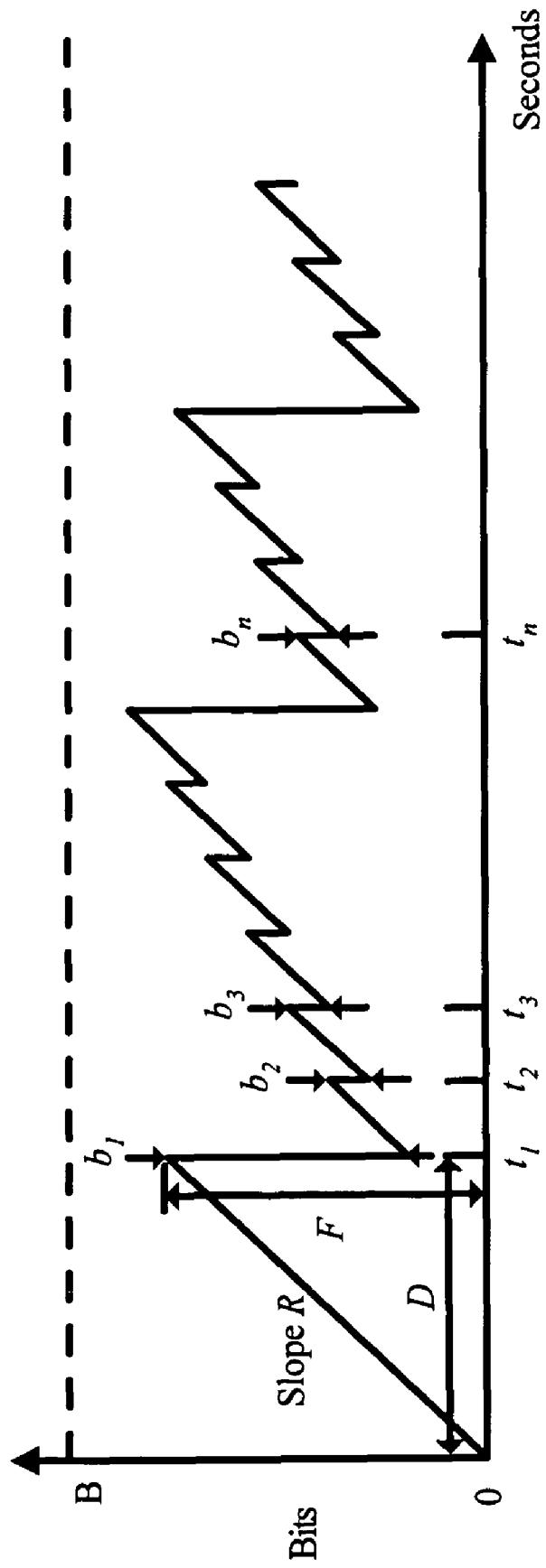
FIG. 6 is a plot illustrating decoder buffer fullness as a function of time for an example bitstream that is contained in a leaky bucket of parameters (R, B, F).

FIG. 6 illustrates the decoder buffer fullness as a function of time for a bitstream that is contained in a leaky bucket of parameters (R, B, F). The plot in FIG. 6 illustrates an example of decoder buffer fullness when decoding a generic video bitstream that is contained in a leaky bucket of parameters (R, B, F). R is the peak incoming (or channel) bit rate in bits/sec. B is the buffer size in bits and F is the initial decoder buffer fullness in bits. D=F/R is the initial or start-up (buffer) delay in seconds. The number of bits for the ith frame is $b_i$. The coded video frames are removed from the buffer (530) (typically according to the video frame rate), as shown by the drops in buffer fullness, and are assumed to be decoded instantaneously. The decoder buffer fullness $\beta_i$ after removing frame i, with i>1, may be expressed as follows:

$$\beta_1 = F - b_1$$

$$\beta_i = \min(B, \beta_{i-1} + R_i(t_i - t_{i-1})) - b_i \quad \text{(Equation Set 1)}$$

where $t_i$ is the decoding time for frame i, and $b_i$ is the number of bits for frame i. The parameter $R_i$ is the average bit rate (in bits per second) that enters the buffer (530) during the time interval $(t_i, t_{i-1})$ and is such that $R_i <= R$ for all i. The transmission rate in FIG. 6 happens to be constant and equal to the peak R, and hence $R_i = R$ for all i.

Figure 7:
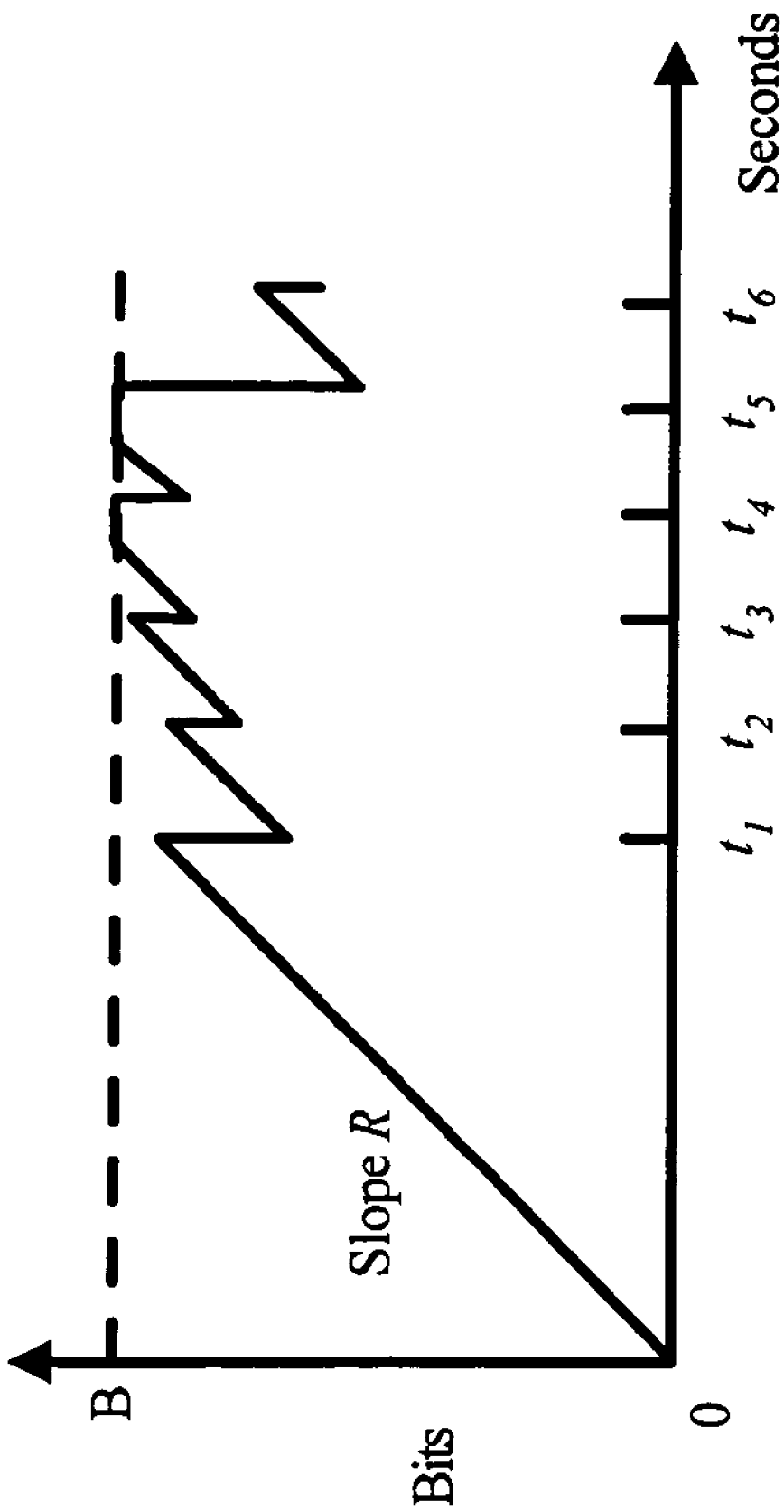
FIG. 7 is a plot illustrating the decoder buffer fullness as a function of time for an example bitstream that is contained in a leaky bucket of parameters (R, B, F) where the buffer fills up to the full buffer size in several periods of time.

Referring back to FIG. 5, in the leaky bucket model defined for the HRD (510), the decoder buffer (530) may fill up, but will not overflow. To be more concrete, the buffer fullness, $\beta$, at any time instant is less than or equal to the buffer size, B. As a result, in Equation Set 1 above, observe that the min(B, x) operator implies that $\beta_i <= B$, for all i. An example of a decoder buffer fullness that fills up to the full buffer size in several periods of time is shown in FIG. 7.

When the decoder buffer (530) of FIG. 5 is full, the encoder (520) will not send any more bits until there is room in the buffer (530). This phenomenon occurs frequently in practice. For example, a DVD includes a video coded bitstream of average rate 4-6 Mbps, while the disk drive speed or peak rate R is about 10 Mbits/sec. Since the bit rate used in most time intervals is less than 10 Mbits/sec, the decoder buffer is often full. More generally, if an encoder is producing fewer bits than those available in the channel, the decoder buffer will stop filling up.

Decoder buffer underflow occurs usually if an encoder produces relatively large frames. The decoder buffer fullness may then be reduced to the point that the bits for the next frame are not available at the nominal decoding time.

A leaky bucket with parameters (R, B, F) is said to contain a coded video bitstream if there is no underflow of the decoder buffer (i.e., $\beta_i >= 0$, for all i). For example, a leaky bucket with parameters (R, B, F) contains a coded video bitstream if the following constraints hold:

$$\beta_1 = F - b_1$$

$$\beta_i = \min(B, \beta_{i-1} + R_i(t_i - t_{i-1})) - b_i, i > 1$$

$$R_i <= R \text{ all } i$$

$$\beta_i >= 0 \text{ all } i \quad \text{(Equation Set 2)}$$

The bitstream includes at least one leaky bucket (R, B, F) that contains the bitstream. Thus, the bitstream includes at least one leaky bucket that meets the constraints of Equation Set 2. The leaky bucket values (R, B, F) are signaled to the decoder so that the rate and buffer size resources that should be available to decode the bitstream are predictable.

A bitstream that meets the constraints of the equations in Equation Set 2 is denoted a variable bit rate or VBR bitstream. For example, see the discussion of VBR bitstreams in the H.262 standard. If the constraints in Equation Set 2 apply to a bitstream without the min(B, x) operator in Equation Set 2 (i.e., $\beta_i=\beta_{i-1}+R_i(t_i-t_{i-1})-b_i$, for all i), if Ri=R for all i, and if there is no buffer overflow (i.e., $\beta_i+b_i<=B$, for all i), the bitstream can be denoted a constant bit rate or CBR bitstream. CBR bitstreams can be thought of as a special case of VBR bitstreams, and they may be subject to the same constraints as VBR bitstreams.

B. Multiple Leaky Buckets

As discussed above, a bitstream may be contained in many leaky buckets. Further, for any value of the peak transmission bit rate R, and assuming $R_i=R$ for all i in Equation Set 2, one may find the minimum buffer size $B_{min}$ and the minimum initial buffer fullness $F_{min}$ that will contain the video bitstream. These minimum values may be computed using a simple search using the constraints in (C.2). By computing $B_{min}$ for each R, we may plot a curve of optimum R-B values such as the one in FIG. 8.

Figure 8:
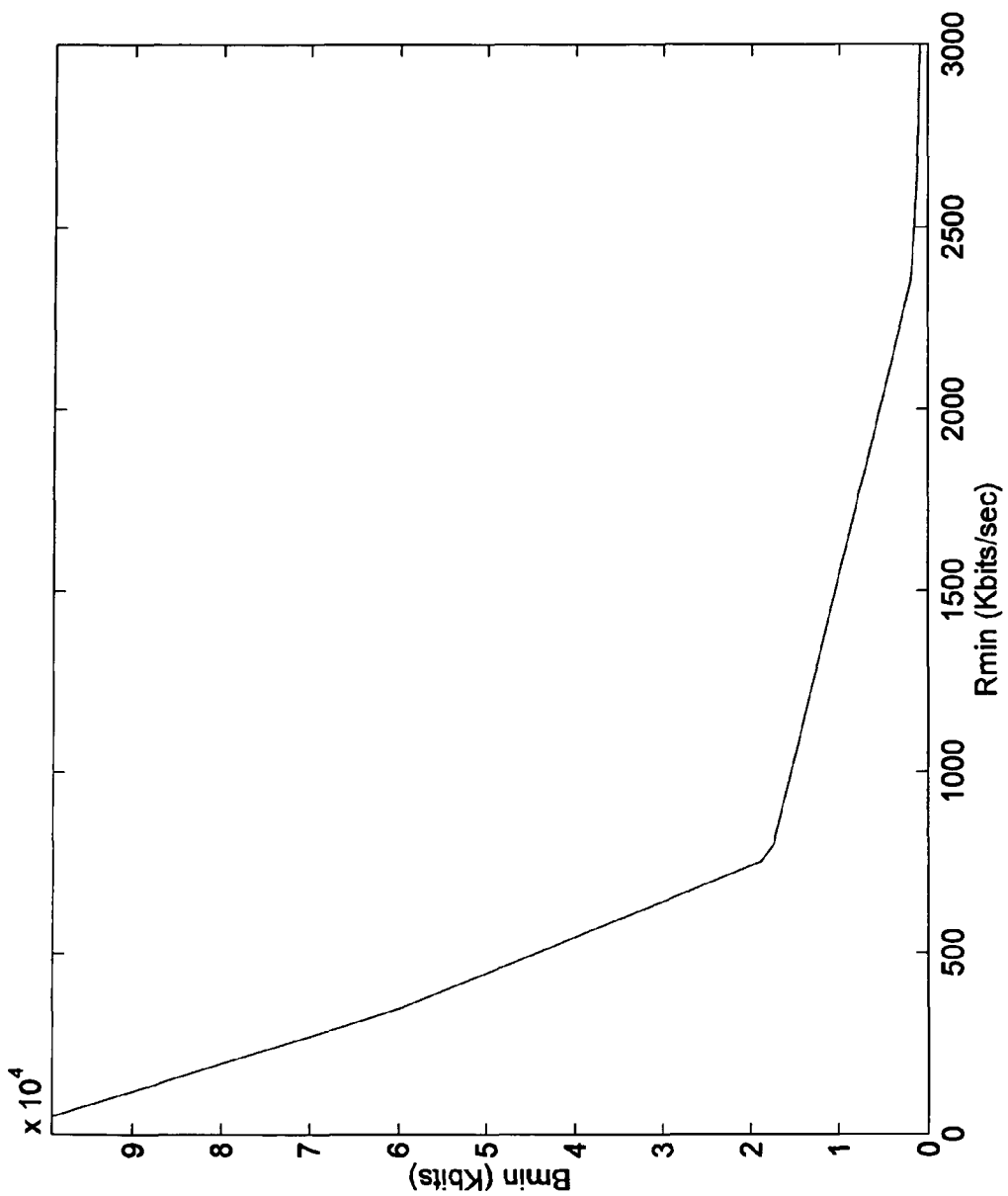
FIG. 8 is a plot that illustrates peak bit rate (Rmin) and buffer size (Bmin) for an example video bitstream.

FIG. 8 illustrates minimum peak bit rates (Rmin for given B values) and minimum buffer sizes (Bmin for given R values) for a given video bitstream. The curve in FIG. 8 indicates that in order to transmit the stream at a peak bit rate R, the decoder needs to buffer at least Bmin(R) bits. Observe that higher peak rates allow smaller buffer sizes. Alternatively, if the size of the decoder buffer is B, the minimum peak rate required for transmitting the bitstream is the associated Rmin (B).

C. General Bitstream Syntax for Hypothetical Reference Decoder

The bitstream signals N leaky bucket models, each of which contain the video bitstream, as defined in Equation Set 2. Referring back to FIG. 5, the desired value of N may be selected by the encoder (520), where N>0. The parameter values of these leaky buckets may be expressed as follows: $(R_1, B_1, F_1), (R_2, B_2, F_2), \ldots, (R_N, B_N, F_N)$.

As discussed below, these HRD syntax element values can be communicated to the decoder (540) by the transport layer for video bitstreams compliant to some profiles, such as a simple and a main profile. In such profiles the syntax elements may alternatively be signaled by default values that are associated with particular profiles and/or levels of encoding. For other profiles, such as an advanced profile, the HRD syntax element values are in the sequence header for the bitstream. Even in such profiles, the HRD syntax elements may not be in the sequence header for some modes, such as in a variable-delay mode.

Observe that the number of bits used in prior frames does not affect the equations in Equation Set 2 to determine the leaky bucket constraints for the remaining of the video bitstream, and hence the leaky bucket values may be modified throughout the video bitstream, such as by including modified values in entry point headers. Also, an encoder may want to use fewer leaky buckets later in the bitstream to avoid syntax overhead.

FIG. 9 illustrates a second example of the encoding of the HRD syntax elements to be signaled at sequence level in the bitstream. The syntax elements HRD_NUM_LEAKY_BUCKETS, HRD_RATE[n], BIT_RATE_EXPONENT, HRD_BUFFER[n], and BUFFER_SIZE_EXPONENT, and HRD_FULLNESS[n] are defined as above. In addition, however, note that HRD_FULLNESS[n] is computed as follows:

$$\text{HRD\_FULLNESS}[n] = \left\lceil 256 \times \frac{\min(B_n, \beta_{i,n}+b_i)}{B_n} \right\rceil - 1 \quad \text{(Equation Set 3)}$$

where $\min(B_n, \beta_{i,n}+b_i)$ is the decoder buffer fullness in bits before removing the current ith frame. In Equation Set 2, the decoder buffer fullness after removing the ith frame equals $\beta_i$. In Equation Set 3, a similar notation is used for the equivalent value $\beta_{i,n}$, but the subscript n denotes the nth leaky bucket. The $\lceil x \rceil$ operator rounds up the value of x to the nearest higher integer. For example, $\lceil 14.31 \rceil = 15$. It can be observed from Equation Set 3 that in the first frame of the video stream (i.e., i=1), the initial buffer fullness $F_n=(\beta_{1,n}+b_1)$.

C. Encoder Considerations

The encoder (520) of FIG. 5 can do one of the following:
(a) Pre-select the leaky bucket values $(R_1, B_1, F_1), (R_2, B_2, F_2), \ldots, (R_N, B_N, F_N)$ and encode the bitstream with a rate control that makes sure that all of the leaky bucket constraints are met.
(b) Encode the bitstream and then use the equations in Equation Set 2 to compute a set of leaky buckets containing the bitstream at N different values of R.
(c) Do both (a) and (b), i.e., pre-select leaky buckets and later compute more after the bitstream is encoded.

Approach (a) may be applied to live or on-demand transmission applications, while (b) and (c) would likely only apply to on-demand transmission applications.

D. Interpolating Leaky Buckets

Figure 10:
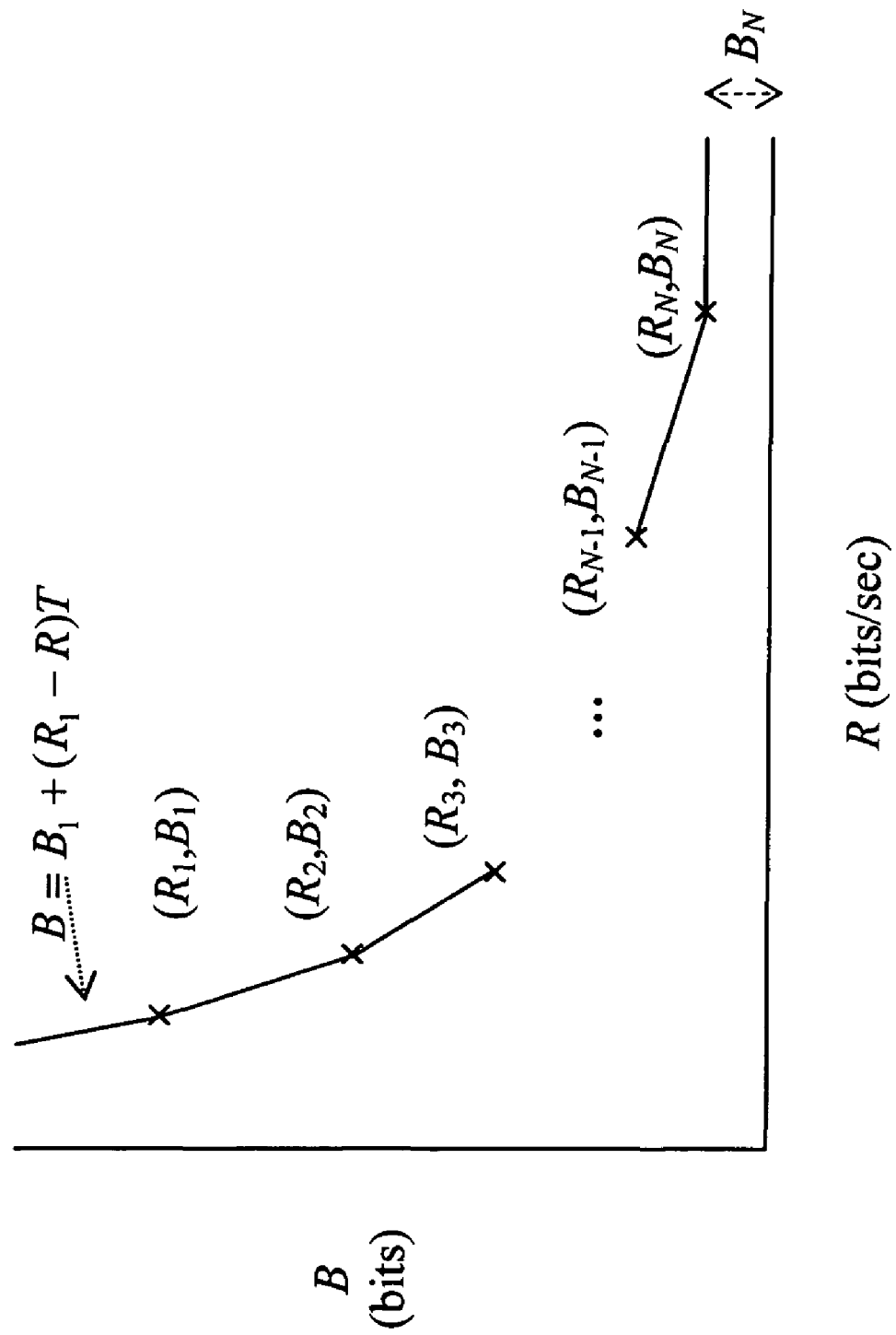
FIG. 10 is a plot that illustrates a set of N leaky bucket models and their interpolated or extrapolated (R, B) values for an example bitstream.

The curve of $(R_{min}, B_{min})$ pairs, or that of $(R_{min}, F_{min})$, is piecewise linear and convex for any bitstream, such as the example in FIG. 10. As a theoretical matter, because of the convexity, if N points of the curve are provided, the decoder (540) of FIG. 5 may linearly interpolate the values to arrive at some points $(R_{interp}, B_{interp}, F_{interp})$ that are slightly but safely larger than $(R_{min}, B_{min}, F_{min})$. As mentioned earlier, the leaky buckets $(R_1, B_1, F_1), (R_2, B_2, F_2), \ldots, (R_N, B_N, F_N)$ are ordered from smallest to largest bit rate, i.e., $R_n<R_{n+1}$. Assuming that the encoder (520) computes these leaky bucket models accordingly, then $B_n>B_{n+1}$. FIG. 10 illustrates a set of N leaky bucket models and their interpolated or extrapolated (R, B) values, all of which contain the bitstream. T is the time length or duration of the encoded video sequence.

The interpolated buffer size B between points n and n+1 follow the straight line:

$$B = \frac{R_{n+1}-R}{R_{n+1}-R_n}B_n + \frac{R-R_n}{R_{n+1}-R_n}B_{n+1}, \quad \text{(Equation Set 4)}$$

$$R_n < R < R_{n+1}$$

Likewise, the initial decoder buffer fullness F may be linearly interpolated:

$$F = \frac{R_{n+1}-R}{R_{n+1}-R_n}F_n + \frac{R-R_n}{R_{n+1}-R_n}F_{n+1}, \quad \text{(Equation Set 5)}$$

$$R_n < R < R_{n+1}$$

As a theoretical matter, the resulting leaky bucket with parameters (R, B, F) is guaranteed to contain the bitstream because the minimum buffer size $B_{min}$ is convex in both R and F, that is, the minimum buffer size $B_{min}$ corresponding to any convex combination $(R, F)=a(R_k, F_k)+(1-a)(R_{k+1}, F_{k+1})$, $0<a<1$, is less than or equal to $B=aB_k+(1-a)B_{k+1}$.

As discussed earlier, if R is larger than $R_N$, the leaky bucket (R, $B_N$, $F_N$) will also contain the bitstream, and hence $B_N$ and $F_N$ are the buffer size and initial decoder buffer fullness recommended when $R \geq R_N$. If R is smaller than $R_1$, then the upper bound $B=B_1+(R_1-R)T$ may be used (and one may set F=B), where T is the time length of the video sequence in seconds. These (R, B) values outside the range of the N points are also shown in FIG. 10.

Using Equation Sets 4 and 5, when the peak transmission rate of a given encoding/decoding system is known, the decoder can determine a nearly minimum leaky bucket buffer size and delay. Alternatively, knowing the physical buffer size, a smart decoder can ask a transmitter to use the smallest peak rate that will enable decoding in such buffer size. In short, the leaky bucket model values ($R_1$, $B_1$, $F_1$), ($R_2$, $B_2$, $F_2$), . . . , ($R_N$, $B_N$, $F_N$) can be linearly interpolated or extrapolated to determine nearly optimum leaky buckets.

E. Display Issues

The leaky bucket model does not directly address the case when a video frame is displayed in the HRD display unit. A decoder, including this HRD, will normally display frames in the proper order. For example, if a frame is composed of two fields, it is assumed that the field that comes first in time will be displayed first. P frames and B frames should also be re-ordered properly before display. If 3:2 pull-up occurs after decoding, the correct fields should be repeated to produce an accurate 3:2 telecine pattern on the display. Constraints on display times (e.g., according to the decoding times $t_1$, $t_2$, etc.) typically belong to the system layer, and are discussed below.

F. Time-Conformant Decoders

Time-conformant decoders ensure a fixed end-to-end delay, and hence they are of interest for most video coding applications (e.g., video broadcast, video on demand, DVD playback, etc.), while non-time-conformant decoders are common mainly for video conferencing. A practical time-conformant decoder needs to decode the bitstreams without suffering from buffer underflow. If a practical decoder wishes to be time-conformant, the HRD parameters discussed above provide some helpful constraints.

Given a fixed transmission rate and decoder buffer size, a time-conformant decoder implementation will buffer enough data initially to prevent buffer underflow during the decoding process. Such a decoder can do this by operating according to one of the N leaky buckets, or one of the interpolated leaky buckets defined in Equation Sets 4 and 5. More specifically, given a channel rate R, a time-conformant decoder can choose a corresponding leaky bucket model or use Equation Sets 4 and 5 to find a minimum value of B and F. The decoder can confirm that the physical buffer size in the decoder is larger than or equal to B and buffer at least F bits before starting the decoding process. Additionally, given a physical buffer size B, a time-conformant decoder can choose a corresponding leaky bucket model or use Equation Sets 4 and 5 to find a minimum value of R and F. The decoder can ensure that the channel rate is larger than or equal to R and buffer at least F bits before starting the decoding process.

G. Benefits of Multiple Leaky Buckets

In the constant-delay mode, typical hypothetical reference decoders operate with a fixed peak bit rate, buffer size, and initial delay. However, in many of today's video applications (e.g., video streaming through the Internet) the peak transmission bit rate varies according to the network path (e.g., how the user connects to the network: by modem, ISDN, DSL, cable, etc.) and also fluctuates in time according to network conditions (e.g., congestion, the number of users connected, etc.). In addition, the bitstreams may be delivered to a variety of devices with different buffer capabilities (e.g.,
hand-sets, PDAs, PCs, set-top-boxes, DVD-like players, etc.) and are created for scenarios with different delay requirements (e.g., low-delay streaming, progressive download or pseudo-streaming, etc.). The multiple leaky bucket approach used in the HRD described herein is flexible and enables a system to decode a bitstream at different peak transmission bit rates, and with different buffer sizes and start-up delays. However, the signaling described herein, including signaling buffer fullness values relative to buffer size, may be advantageous even if multiple leaky bucket models are not used.

Regarding the theoretical advantages of multiple leaky buckets, given a desired peak transmission bit rate, a time-conformant decoder can select the smallest buffer size and delay (according to the available leaky bucket data) that will be able to decode the bitstream without suffering from buffer underflow. Conversely, for a given buffer size, the hypothetical decoder can select and operate at the minimum required peak transmission bit rate.

There are multiple benefits of this type of generalized hypothetical reference decoder. For example, a content provider may create a bitstream once, and a server may deliver it to multiple devices of different capabilities, using a variety of channels having different peak transmission bit rates. Or a server and a terminal may negotiate the best leaky bucket for the given networking conditions, e.g., the one that will produce the lowest start-up (buffer) delay, or the one that will require the lowest peak transmission bit rate for the given buffer size of the device. It is believed that the multiple leaky bucket approach provides large savings in peak rate, buffer size, delay and even quality in encoding/decoding systems in many situations.

V. First Bitstream Syntax

Implementation for Hypothetical Reference Decoder

A. Sequence Level Syntax Elements

Figure 11:
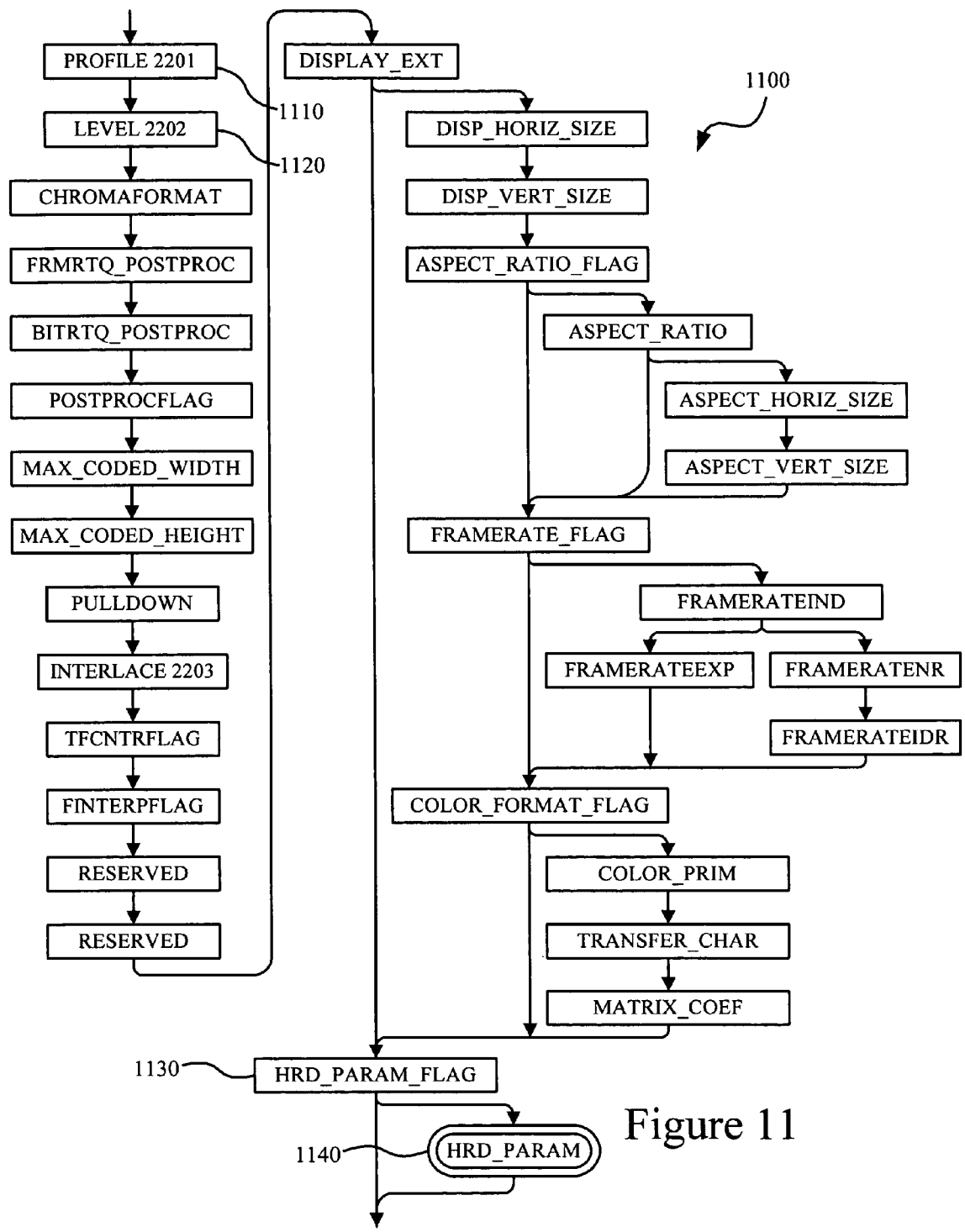
FIG. 11 is a diagram showing a sequence layer of example bitstream syntax with syntax elements for signaling hypothetical reference decoder information.

In an advanced profile of a first bitstream syntax implementation, a sequence-level header that is part of the video data bitstream contains sequence-level syntax elements used to decode the sequence of compressed pictures. FIG. 11 is a sequence layer bitstream diagram (1100) for a sequence showing an example of bitstream elements that make up the sequence header for the advanced profile, including HRD syntax elements. PROFILE (1110) is a 2-bit syntax element that specifies the profile used to encode the sequence, and is set to 3 to indicate advanced profile. The values 0, 1, and 2 are reserved.

LEVEL (1120) is a 3-bit syntax element that specifies encoding levels 0 through 4 for the clip in the advanced profile. The codes that are used to signal the levels in the advanced profile are defined as shown in FIG. 12.

Referring back to FIG. 11, the bitstream element HRD_PARAM_FLAG (1130) is a 1-bit flag that indicates the presence of HRD parameters, HRD_PARAM (1140), in the bitstream. If HRD_PARAM_FLAG (1130) is 0, HRD_PARAM (1140) is not present. If HRD_PARAM_FLAG (1130) is 1, HRD_PARAM (1140) is present. The HRD_PARAM (1140) parameters are the same as the syntax elements described above with reference to FIG. 4 (HRD_NUM_LEAKY_BUCKETS, BIT_RATE_EXPONENT, BUFFER_SIZE_EXPONENT, HRD_RATE[n], and HRD_BUFFER[n]). Other bitstream elements shown in FIG. 11 relate to other aspects of decoding.

If the HRD_PARAM_FLAG (1130) is zero, then variable delay mode is signaled. If so, then the values of Rmax and VBVmax shown in FIG. 13 for the particular profile and level signaled can be used for the HRD model.

In main and simple profiles, the sequence-related metadata is communicated to the decoder in some other manner, such as by the transport layer. This metadata may include a PROFILE metadata element that specifies the encoding profile used to produce the sequence, and is set to 0 or 1 to indicate simple or main profile, respectively. It may also include a LEVEL metadata element that specifies the encoding level for the bitstream. Additionally, the transport layer may communicate the HRD syntax element values to the decoder for video bit streams compliant to the simple and main profiles.

B. Entry Point Level Syntax Elements

Figure 14:
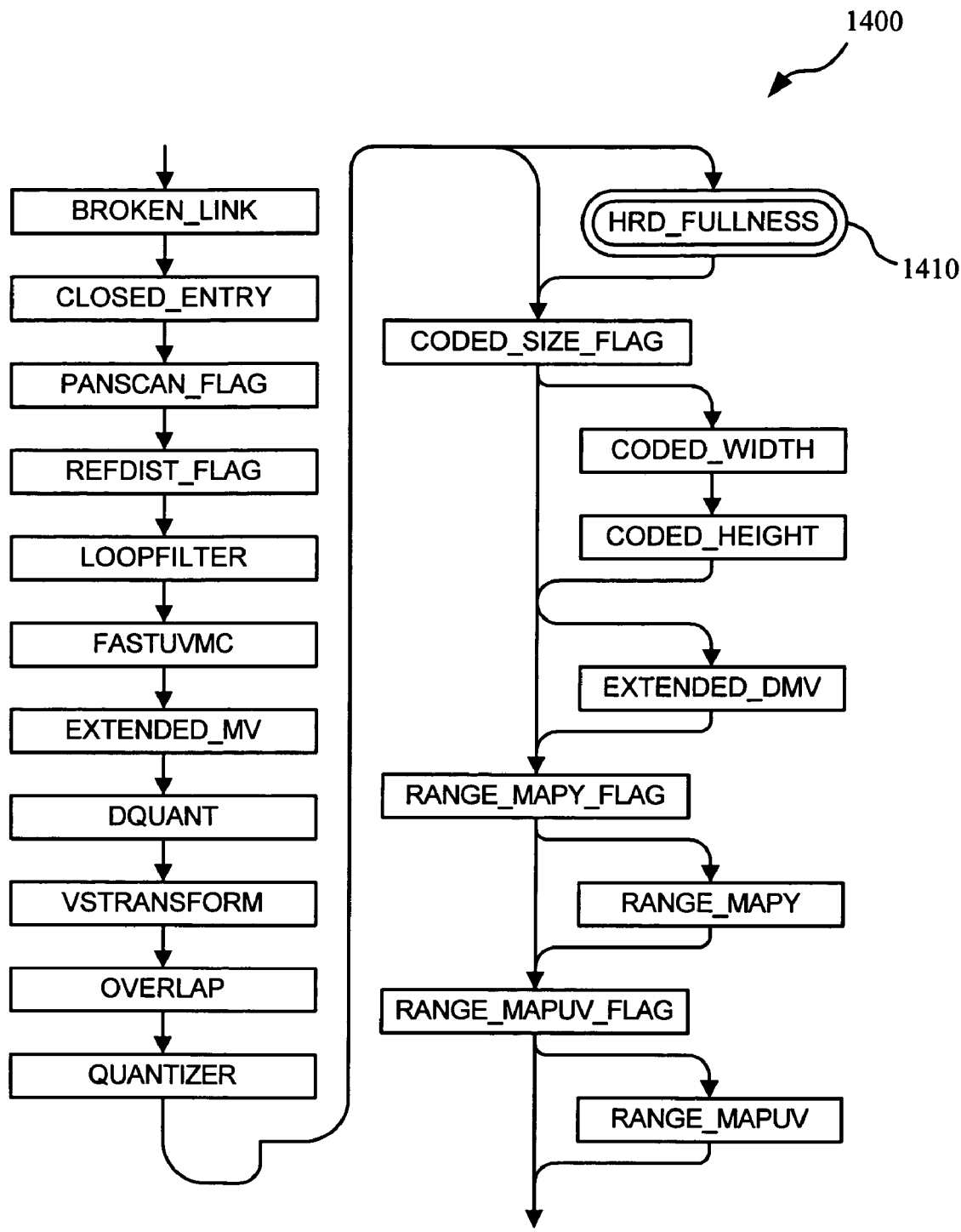
FIG. 14 is an example syntax diagram showing the syntax elements that make up an entry-point layer.

An entry-point header is present in the advanced profile syntax of the bitstream. The entry point is used to signal a random access point within the bitstream, and subsequent pictures can be decoded starting from the entry point. The entry point is the typical location in the bitstream that a receiver will look for after a channel tuning command or a trick mode command, such as a fast forward or fast rewind command. Additionally, the entry-point header may be used to signal changes in the coding control parameters. An entry-point header contains syntax elements specifying the HRD buffer fullness, as well as other parameters that relate to other aspects of decoding. FIG. 14 is a syntax diagram (1400) showing the syntax elements that make up the entry-point layer.

HRD_FULLNESS (1410) is a variable size syntax element that is present if the HRD_PARAM_FLAG (1130) if the sequence header is set to 1. HRD_FULLNESS (1410) is defined as described in Section III above. FIG. 15 is a table illustrating an example of coding hypothetical reference decoder fullness values in the entry point header. When decoding begins at a particular entry point, the HRD_FULLNESS (1410) syntax element in the entry-point header signals the minimum buffer fullness to be obtained before decoding may begin. Underflow (as described in previous sections) may occur if the decoding starts before this level of fullness is achieved in the video elementary stream buffer. Other elements shown in FIG. 14 relate to other aspects of decoding.

Figure 16:
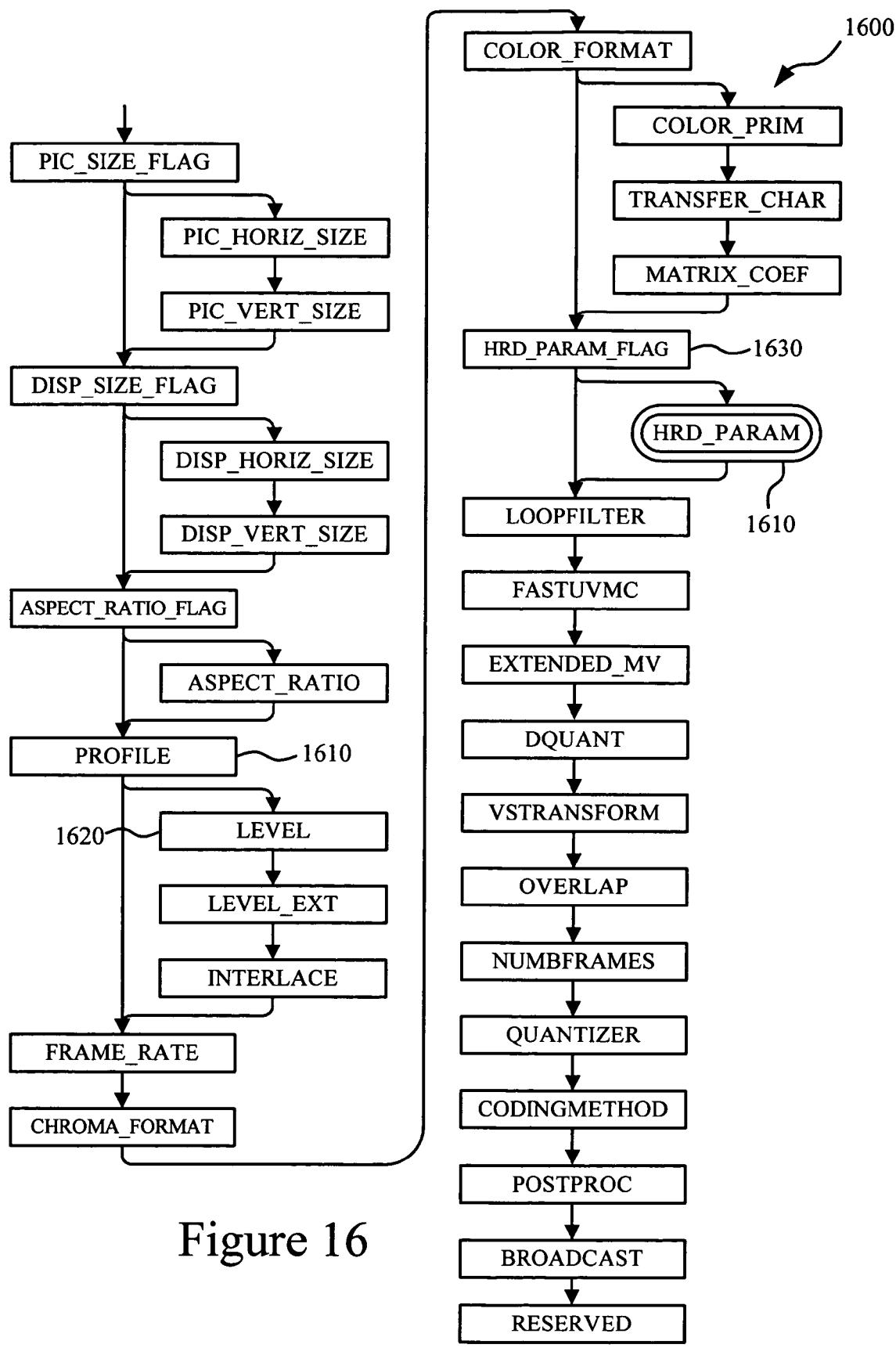
FIG. 16 is a diagram showing a sequence layer of a second example bitstream syntax with syntax elements for signaling hypothetical reference decoder information.

VI. Second Bitstream Syntax
Implementation for Hypothetical Reference Decoder
A. Sequence Level Syntax Elements A sequence-level header in the advanced profile of a second bitstream syntax implementation contains sequence-level parameters used to decode the sequence of compressed pictures. In some systems this header can be made available to the decoder either as eternally-communicated decoder configuration information or as part of the video data bitstream. FIG. 16 is a syntax diagram (1600) for the sequence layer bitstream showing the bitstream elements that make up the sequence layer.

The bitstream element PROFILE (1610) is a 2-bit field that specifies the encoding profile used to produce the clip. The three profiles are simple, main, and advanced profile and they correspond to PROFILE=0, 1, and 2, respectively. The bitstream element LEVEL (1620) is a 2-bit field that is present only if the PROFILE (1610) takes the value corresponding to advanced profile. The following codes are used to signal the levels in the advanced profile:

| 00 | Low Level |
| 01 | Middle Level |
| 10 | High Level |
| 11 | Reserved |

The levels for the simple and main profiles are communicated to the decoder by external means. Alternatively, LEVEL (1620) may be present whether PROFILE signals the advanced, main, or simple profile.

The bitstream element HRD_PARAM_FLAG (1630) is a 1-bit flag that indicates the presence of HRD_PARAM (1640) in the bitstream. If the HRD_PARAM_FLAG (1630) is 0, HRD_PARAM (1640) is not present. If HRD_PARAM_FLAG (1630) is 1, syntax elements of the HRD are present. HRD_PARAM (1640) refers to the same HRD parameters that are discussed above with reference to FIG. 9, namely HRD_NUM_LEAKY BUCKETS, BIT_RATE_EXPONENT, BUFFER_SIZE_EXPONENT, HRD_RATE[n], HRD_BUFFER[n], and HRD_FULLNESS[n]. HRD_FULLNESS[n] is included in the sequence header, rather than in the entry point headers, as in the first bitstream syntax implementation discussed above.

If the HRD_PARAM_FLAG (1630) is zero, then variable delay mode may be signaled. Alternatively, variable delay mode may be signaled if a VARIABLE_DELAY syntax element (not shown) equals 1. In this mode, the values of Rmax and Bmax shown in FIG. 17 for the particular profile and level signaled can be used for the HRD model. In the table of FIG. 17, the Profile @ Level column (1710) refers to the profile and level signaled by PROFILE (1610) and LEVEL (1620). The Rmax column (1720) indicates the HRD's maximum peak transmission bit rate in units of 1,000 bits/second for the particular profile and level indicated. The Bmax column (1730) indicates the HRD's maximum buffer size for the particular profile and level indicated in units of 16,384 bits. Other columns in the table of FIG. 17 represent other limitations associated with particular profiles and levels. In the situation where the HRD buffer parameters are not signaled, the default buffer fullness is the size of the entire buffer, Bmax.

Alternatively, an HRD uses a different syntax for HRD parameters that includes buffer fullness values signaled relative to buffer sizes.

VII. Using Initial Buffer Fullness to Determine a Decoding Time Stamp

An HRD_FULLNESS parameter corresponds to the minimum level of buffer fullness that must be achieved before the oldest video access units in a video elementary stream buffer can be taken out and fed into the decoder. Each HRD_FULLNESS value is specific to a delivery rate, and an elementary stream may include several HRD_FULLNESS values, each associated with a different leaky bucket model.

The transfer of data from the video elementary stream to the decoder is typically driven by a decoding time stamp, or decoding time instant, such as the decoding time stamps used in the MPEG-2 system layer. The discussion below describes a method for producing an initial decoding time stamp from an HRD_FULLNESS field value in an elementary stream. For example, the buffer fullness value may be used with a rate value to calculate a corresponding decoding time instant relative to a system time clock in the receiver. Subsequent decoding time stamps are derived from the initial decoding time stamp. As an example, a digital video receiver (DVD player, Set Top Box, Digital Receiver, PC) could use this method to determine the time at which the first video access unit after a sequence header should start being decoded. Because this method calculates a time stamp according to an underlying protocol, it provides elementary stream decoding interoperability across platform, independently of the underlying transport protocol.

For example, upon tuning or skipping operation according to the advanced profile of the first bitstream syntax implementation discussed above, a video receiver latches on to the nearest entry point header in the elementary stream and reads (or interpolates from the values transmitted in the elementary streams) the HRD_FULLNESS field value associated with the rate at which the stream is being received.

The decoding time for the first video access unit following the entry point header is determined based on the value of the HRD_FULLNESS independently of the underlying transport. The time required to load the buffer to the prescribed level can be determined according to Equation Set 6:

LOADING TIME=((HRD_FULLNESS[$n$]+1)*$B_n$)/ (256*$R_n$)   (Equation Set 6)

where $B_n$ is the buffer size associated with the nth HRD buffer model and $R_n$ is the rate associated with the nth HRD buffer model. $R_n$ is calculated from the associated value of HRD_RATE[n] and BIT_RATE_EXPONENT. $R_n$ may also be interpolated for the HRD parameters transmitted in the bitstream. As mentioned earlier, buffer underflow will not occur if the minimum fullness is reached in the video elementary stream before decoding is initiated in the decoder. Consequently, the calculation of LOADING_TIME shown above may include a value larger than HRD_FULLNESS[n] which is the minimum value of fullness to achieve.

In a decoder, the loading time typically is referenced to the cycles of a system time clock running in the receiver, such as a 27 Mhz clock in the MPEG-2 System Layer. The loading time may be represented in units of cycles of another clock derived from the system clock according to Equation Set 7:

LOADING_CYCLES=LOADING TIME*CLOCK_FREQUENCY   (Equation Set 7)

For example, in the MPEG-2 system layer, the value of CLOCK_FREQUENCY is 90 kHz=27 Mhz/300. If the system time clock in the receiver is equal to T0_CYCLES when the first byte of the video access unit enters the video elementary buffer, then the decoding time stamp (DTS) can be determined by Equation Set 8:

DTS=$T0$_CYCLES+LOADING_CYCLES   (Equation Set 8)

where DTS is expressed in units of cycles of the clock with frequency value equal to CLOCK_FREQUENCY. The value DTS defines the instant when decoding of the first video access unit can start with the guarantee that the video elementary buffer will not underflow.

The DTS values may be determined from the HRD_FULLNESS values as discussed above by the encoder or a packetizer, which then transmits the DTS values to the decoder. Alternatively, the decoder itself may determine the DTS values from the HRD_FULLNESS values. As yet another alternative, the DTS values may be determined from the HRD_FULLNESS values as discussed above by the encoder or a packetizer, and the decoder may independently determine the DTS values from the HRD_FULLNESS values and check them against the DTS values transmitted from the encoder or packetizer. If there is a discrepancy between the DTS values determined by a decoder from the HRD_FULLNESS values and the DTS values sent to the decoder in an underlying layer, such as a system layer, then the decoder would use the DTS determined from the HRD_FULLNESS value. A decoder can use this value to determine the amount of time it must wait for its buffer to fill up before decoding of the first access unit can start. Additionally, because the value of DTS can be derived independently from any underlying synchronization layer, the value of DTS as determined by a decoder from HRD_FULLNESS can be locked to another system layer to determine a constant offset between the DTS determined from the HRD_FULLNESS value and the clock of the other system layer.

The value of HRD_FULLNESS may alternatively be used in some other manner by a decoder and/or encoder to determine the time at which decoding should start to assure that the buffer includes the number of bits indicated by HRD_FULLNESS before decoding begins.

Having described and illustrated the principles of our innovations, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

We claim:

1. In a computing device that implements a video decoder, a method of decoding video, the method comprising:
    with the computing device that implements the video decoder, receiving and parsing encoded information from a bitstream for a video sequence, including:
        parsing a sequence-level flag that indicates whether syntax elements for hypothetical reference decoder (HRD) parameters are signaled in the bitstream;
        if the sequence-level flag indicates the syntax elements for HRD parameters are signaled in the bitstream, parsing one or more sequence-level HRD syntax elements, including parsing at least one buffer capacity syntax element that indicates a decoder buffer capacity associated with at least a portion of the bitstream;
        receiving an entry point header that includes coding control parameters for controlling aspects of decoding of plural subsequent pictures after an entry point, wherein the entry point is a random access point in the bitstream after which decoding of the subsequent pictures can begin;
        parsing the coding control parameters from the entry point header and, if the sequence-level flag indicates the syntax elements for HRD parameters are signaled in the bitstream, parsing one or more entry point-level HRD syntax elements from the entry point header along with the coding control parameters, including parsing at least one buffer fullness syntax element that indicates a buffer fullness associated with at least a portion of the bitstream at the random access point, wherein the buffer fullness is signaled as a fraction of the decoder buffer capacity; and
        otherwise, if the sequence-level flag indicates the syntax elements for HRD parameters are not signaled in the bitstream, skipping the parsing of the one or more sequence-level HRD syntax elements and the parsing of the one or more entry point-level HRD syntax elements; and
    with the computing device that implements the video decoder, decoding video using the encoded information, wherein the coding control parameters from the entry point header control aspects of decoding of the subsequent pictures after the entry point.

2. The method of claim 1 further including, as part of the parsing of the one or more sequence-level HRD syntax elements, with the computing device that implements the video decoder, parsing at least one transmission rate syntax element that indicates a peak transmission bit rate for at least a portion of the bitstream.

3. The method of claim 2, wherein the peak transmission bit rate, the decoder buffer capacity, and the buffer fullness form a leaky bucket model that contains the bitstream.

4. The method of claim 3, wherein, when the sequence-level flag indicates the syntax elements for HRD parameters are signaled in the bitstream, the computing device that implements the video decoder repeats the parsing the at least one buffer capacity syntax element, the at least one buffer fullness syntax element, and the at least one transmission rate syntax element for each of one or more additional leaky bucket models that contain the bitstream.

5. The method of claim 1 wherein, when the sequence-level flag indicates the syntax elements for HRD parameters are signaled in the bitstream, the computing device that implements the video decoder parses a different buffer capacity syntax element for each of plural leaky bucket models, and wherein the parsing the at least one buffer capacity syntax element comprises:
  parsing a single buffer capacity exponent common to all of the plural leaky bucket models, wherein the single buffer capacity exponent is represented with a fixed-length code; and
  parsing a buffer capacity mantissa for each of the plural leaky bucket models, wherein each buffer capacity mantissa is represented with a fixed-length code.

6. The method of claim 1 wherein the sequence-level flag also indicates whether HRD operations use constant or variable delay mode, the syntax elements for HRD parameters being signaled for the constant delay mode but not for the variable delay mode.

7. In a computing device that implements a video encoder, a method of encoding video, the method comprising:
  with the computing device that implements the video encoder, encoding video for a video sequence to produce encoded video information; and
  from the computing device that implements the video encoder, outputting the encoded video information in a bitstream for the video sequence, including:
    signaling a sequence-level flag that indicates whether syntax elements for hypothetical reference decoder (HRD) parameters are signaled in the bitstream;
    if the sequence-level flag indicates the syntax elements for HRD parameters are signaled in the bitstream, signaling at least one transmission rate syntax element that indicates a transmission bit rate and at least one buffer capacity syntax element that indicates decoder buffer capacity; and
    signaling an entry point header that includes coding control parameters for controlling aspects of decoding of plural subsequent pictures after an entry point, wherein the entry point is a random access point in the bitstream after which decoding of the subsequent pictures can begin;
    if the sequence-level flag indicates syntax elements for HRD parameters are signaled in the bitstream, signaling along with the coding control parameters as part of the entry point header one or more buffer fullness syntax elements that each indicates a buffer fullness relative to the buffer capacity; and
    otherwise, if the sequence-level flag indicates the syntax elements for HRD parameters are not signaled in the bitstream, skipping the signaling of the at least one transmission rate syntax element, the at least one buffer capacity syntax element and the buffer fullness syntax elements.

8. The method of claim 7, wherein the one or more buffer fullness syntax elements each indicates the buffer fullness as a fraction of the buffer capacity.

9. The method of claim 8, wherein the one or more buffer fullness syntax elements are each in the range of 0 to 255.

10. The method of claim 7 further comprising, when the sequence-level flag indicates the syntax elements for HRD parameters are signaled in the bitstream, with the computing device that implements the video encoder, repeating the signaling the at least one transmission rate syntax element, the signaling the at least one buffer capacity syntax element, and the signaling the one or more buffer fullness syntax elements for each of plural leaky bucket models that contain the bitstream.

11. The method of claim 7 wherein the sequence-level flag also indicates whether HRD operations use constant or variable delay mode, the syntax elements for HRD parameters being signaled for the constant delay mode but not for the variable delay mode.

12. In a computing device that implements a video decoder, a method of decoding video, the method comprising:
  with the computing device that implements the video decoder, receiving and parsing encoded information from a bitstream for a video sequence, including:
    parsing a sequence-level flag that indicates whether syntax elements for hypothetical reference decoder (BIRD) parameters are signaled in the bitstream;
    if the sequence-level flag indicates syntax elements for HRD parameters are signaled in the bitstream, parsing at least one transmission rate syntax element that indicates a peak transmission bit rate for the bitstream and parsing at least one buffer size syntax element that indicates a buffer size;
    receiving an entry point header that includes coding control parameters for controlling aspects of decoding of plural subsequent pictures after an entry point, wherein the entry point is a random access point in the bitstream after which decoding of the subsequent pictures can begin;
    parsing the coding control parameters from the entry point header and, if the sequence-level flag indicates the syntax elements for HRD parameters are signaled in the bitstream, parsing from the entry point header along with the coding control parameters at least one buffer fullness syntax element that indicates a buffer, fullness in units of buffer size divided by a denominator for a portion of the bitstream at the random access point;
    if the sequence-level flag indicates the syntax elements for HRD parameters are not signaled in the bitstream, with the computing device that implements the video decoder, determining the peak transmission bit rate and the buffer size from a profile and a level, wherein a profile syntax element signaled in the bitstream indicates the profile, and wherein a level syntax element signaled in the bitstream indicates the level;
    wherein the video decoder is operable to determine the buffer size from the at least one buffer size syntax element and also operable to determine the buffer size from the profile and the level; and
  with the computing device that implements the video decoder, decoding video using the encoded information, wherein the coding control parameters from the entry point header control aspects of decoding of the subsequent pictures after the entry point, and wherein the decoding includes:

using at least part of a leaky bucket model parameterized by the peak transmission bit rate and the buffer size to determine a minimum buffer fullness value F in bits; and buffering at least F bits before decoding the portion of the bitstream.

13. The method of claim 12, wherein the denominator is 256.

14. The method of claim 13, wherein the buffer fullness syntax element is in the range of 0 to 255.

15. The method of claim 12 wherein the sequence-level flag also indicates whether HRD operations use constant or variable delay mode, the syntax elements for HRD parameters being signaled for the constant delay mode but not for the variable delay mode.

16. In a computing device that implements a video encoder, a method of encoding video, the method comprising:

with the computing device that implements the video encoder, encoding video for a video sequence to produce encoded video information; and from the computing device that implements the video encoder, outputting the encoded video information in a bitstream for the video sequence, including:

determining whether a decoder buffer capacity is to be indicated by buffer capacity syntax element in the bitstream or by profile and level for decoding;

in a sequence header, signaling a sequence-level flag that indicates whether syntax elements for hypothetical reference decoder (HRD) parameters are signaled in the bitstream;

if the sequence-level flag indicates the syntax elements for HRD parameters are signaled in the bitstream:

signaling at least one transmission rate syntax element in the sequence header of the bitstream for the video sequence, the at least one transmission rate syntax element indicating a transmission bit rate;

signaling at least one buffer capacity syntax element in the sequence header of the bitstream for the video sequence, the at least one buffer capacity syntax element indicating the decoder buffer capacity; and signaling an entry point header that includes coding control parameters for controlling aspects of decoding of plural subsequent pictures after an entry point, wherein the entry point is a random access point in the bitstream after which decoding of the subsequent pictures can begin;

if the sequence-level flag indicates syntax elements for HRD parameters are signaled in the bitstream, signaling at least one buffer fullness syntax element along with the coding control parameters in the entry point header in the bitstream, the at least one buffer fullness syntax element indicating a buffer fullness for the bitstream at the random access point; and otherwise, if the sequence-level flag indicates the syntax elements for HRD parameters are not signaled in the bitstream, skipping the signaling of the at least one transmission rate syntax element, the at least one buffer capacity syntax element and the buffer fullness syntax elements, wherein the transmission bit rate and the decoder buffer capacity are instead indicated by the profile and the level for decoding, the profile and the level being signaled in the bitstream with a profile syntax element and a level syntax element, respectively.

17. The method of claim 16, wherein the at least one buffer fullness syntax elements indicates the buffer fullness as a fraction of the buffer capacity.

18. The method of claim 17, wherein the at least one buffer fullness syntax elements are each in the range of 0 to 255.

19. The method of claim 16, further comprising, when the sequence-level flag indicates the syntax elements for HRD parameters are signaled in the bitstream, with the computing device that implements the video encoder, repeating the signaling the at least one transmission rate syntax element, the signaling the at least one buffer capacity syntax element, and the signaling the one or more buffer fullness syntax elements for each of plural leaky bucket models that contain the bitstream.

20. The method of claim 16 wherein the at least one buffer capacity syntax element comprises a buffer capacity exponent common to all of plural leaky bucket models and a buffer capacity mantissa, wherein the buffer capacity exponent is represented with a fixed-length code, and wherein the buffer capacity mantissa is represented with a fixed-length code.

21. The method of claim 16 wherein the at least one transmission rate syntax element comprises a transmission rate exponent common to all of plural leaky bucket models and a transmission rate mantissa, wherein the transmission rate exponent is represented with a fixed-length code, and wherein the transmission rate mantissa is represented with a fixed-length code.

22. The method of claim 16 wherein the sequence-level flag also indicates whether HRD operations use constant or variable delay mode, the syntax elements for HRD parameters being signaled for the constant delay mode but not for the variable delay mode.

23. In a computing device that implements a video decoder, a method of decoding video, the method comprising:

with the computing device that implements the video decoder, receiving and parsing encoded information from a bitstream, including:

parsing a sequence-level syntax element that indicates whether plural syntax elements for hypothetical reference decoder (HRD) parameters are signaled in the bitstream for a HRD;

determining whether the plural syntax elements for HRD parameters are signaled in the bitstream using the sequence-level syntax element;

if the plural syntax elements for HRD parameters are signaled in the bitstream, parsing the plural syntax elements for HRD parameters by, for each of one or more leaky bucket models, parsing a buffer size syntax element that indicates a buffer size of the leaky bucket model and parsing a rate syntax element that indicates a rate of the leaky bucket model;

receiving an entry point header that includes coding control parameters for controlling aspects of decoding of plural subsequent pictures after an entry point, wherein the entry point is a random access point in the bitstream after which decoding of the subsequent pictures can begin; and parsing the control parameters from the entry point header and, if the sequence-level flag indicates the syntax elements for HRD parameters are signaled in the bitstream, for each of the one or more leaky bucket models, parsing from the entry point header along with the coding control parameters a buffer fullness syntax element that indicates a buffer fullness signaled as a fraction of the buffer size of the leaky bucket model;

if the plural syntax elements for HRD parameters are not signaled in the bitstream, with the computing device that implements the video decoder:
  determining a profile and level of decoding based upon a profile syntax element and level syntax element, respectively; and
  determining a buffer size and a rate associated with the profile and level of decoding;
wherein the video decoder is operable to determine the buffer size from the buffer size syntax element and also operable to determine the buffer size from the profile and the level; and with the computing device that implements the video decoder, decoding video using the encoded information, wherein the coding control parameters from the entry point header control aspects of decoding of the subsequent pictures after the entry point.

24. The method of claim 23 wherein, if the plural leaky bucket parameters are not signaled in the bitstream, the HRD uses a variable delay mode and otherwise the HRD uses a constant delay mode.

* * * * *